(12) United States Patent
Boemler

(10) Patent No.: US 7,768,562 B2
(45) Date of Patent: Aug. 3, 2010

(54) METHOD, APPARATUS AND SYSTEM PROVIDING IMAGER VERTICAL BINNING AND SCALING USING COLUMN PARALLEL SIGMA-DELTA DIGITAL CONVERSION

(75) Inventor: Christian Boemler, Lake Oswego, OR (US)

(73) Assignee: Micron Technology, Inc., Boise, ID (US)

( * ) Notice: Subject to any disclaimer, the term of this patent is extended or adjusted under 35 U.S.C. 154(b) by 791 days.

(21) Appl. No.: 11/545,063

(22) Filed: Oct. 10, 2006

(65) Prior Publication Data

US 2008/0084341 A1    Apr. 10, 2008

(51) Int. Cl.
*H04N 3/14* (2006.01)
*H04N 5/335* (2006.01)
*H03M 3/00* (2006.01)
*H01L 27/00* (2006.01)

(52) U.S. Cl. .................... 348/302; 341/143; 250/208.1

(58) Field of Classification Search .............. 348/302, 348/310
See application file for complete search history.

(56) References Cited

U.S. PATENT DOCUMENTS

| | | | |
|---|---|---|---|
| 6,937,279 B1 * | 8/2005 | Kim et al. ............... | 348/308 |
| 7,242,332 B1 * | 7/2007 | Boemler ................. | 341/118 |
| 7,483,067 B2 * | 1/2009 | Boemler ................. | 348/308 |
| 7,545,300 B2 * | 6/2009 | Boemler ................. | 341/143 |
| 2004/0100461 A1 * | 5/2004 | Fortier .................... | 345/204 |
| 2005/0012836 A1 * | 1/2005 | Guidash ................. | 348/302 |

* cited by examiner

Primary Examiner—Kelly L Jerabek
(74) Attorney, Agent, or Firm—Dickstein Shapiro LLP

(57) ABSTRACT

A method, apparatus and system are disclosed for digitizing a plurality of analog pixel signals of a pixel array in a manner which produces a digital signal representing the combination of said plurality of analog pixel signals. A readout architecture performs at least some binning and/or scaling operations in the readout and analog to digital conversion circuits relieving an image processor from the task of performing these operations.

50 Claims, 18 Drawing Sheets

| | | | | | | | | | |
|---|---|---|---|---|---|---|---|---|---|
| READOUT 350 | | READOUT 352 | | READOUT 354 | | READOUT 356 | | READOUT 358 | |
| 330 | 331 | | | | | | | | |
| G2 370 | B 380 | G2 | B | G2 | B | G2 | B | G2 | B |
| R 371 | G1 381 | R | G1 | R | G1 | R | G1 | R | G1 |
| G2 372 | B 382 | G2 | B | G2 | B | G2 | B | G2 | B |
| R 373 | G1 383 | R | G1 | R | G1 | R | G1 | R | G1 |
| G2 374 | B 384 | G2 | B | G2 | B | G2 | B | G2 | B |
| R 375 | G1 385 | R | G1 | R | G1 | R | G1 | R | G1 |
| G2 376 | B 386 | G2 | B | G2 | B | G2 | B | G2 | B |
| R 377 | G1 387 | R | G1 | R | G1 | R | G1 | R | G1 |
| G2 378 | B 388 | G2 | B | G2 | B | G2 | B | G2 | B |
| R 379 | G1 389 | R | G1 | R | G1 | R | G1 | R | G1 |
| READOUT 360 | | READOUT 362 | | READOUT 364 | | READOUT 366 | | READOUT 368 | |

FIG. 3
PRIOR ART

| | | READOUT 350 | READOUT 352 | READOUT 354 | READOUT 356 | READOUT 358 |
|---|---|---|---|---|---|---|
| 340 | | 330  331 | | | | |
| 390 | G2 370 | B 380 | G2  B | G2  B | G2  B | G2  B |
| 391 | R 371 | G1 381 | R  G1 | R  G1 | R  G1 | R  G1 |
| 392 | G2 372 | B 382 | G2  B | G2  B | G2  B | G2  B |
| 393 | R 373 | G1 383 | R  G1 | R  G1 | R  G1 | R  G1 |
| 394 | G2 374 | B 384 | G2  B | G2  B | G2  B | G2  B |
| 395 | R 375 | G1 385 | R  G1 | R  G1 | R  G1 | R  G1 |
| 396 | G2 376 | B 386 | G2  B | G2  B | G2  B | G2  B |
| 397 | R 377 | G1 387 | R  G1 | R  G1 | R  G1 | R  G1 |
| 398 | G2 378 | B 388 | G2  B | G2  B | G2  B | G2  B |
| 399 | R 379 | G1 389 | R  G1 | R  G1 | R  G1 | R  G1 |
| | | READOUT 360 | READOUT 362 | READOUT 364 | READOUT 366 | READOUT 368 |

| FIG. 13A | FIG. 13B |
|---|---|

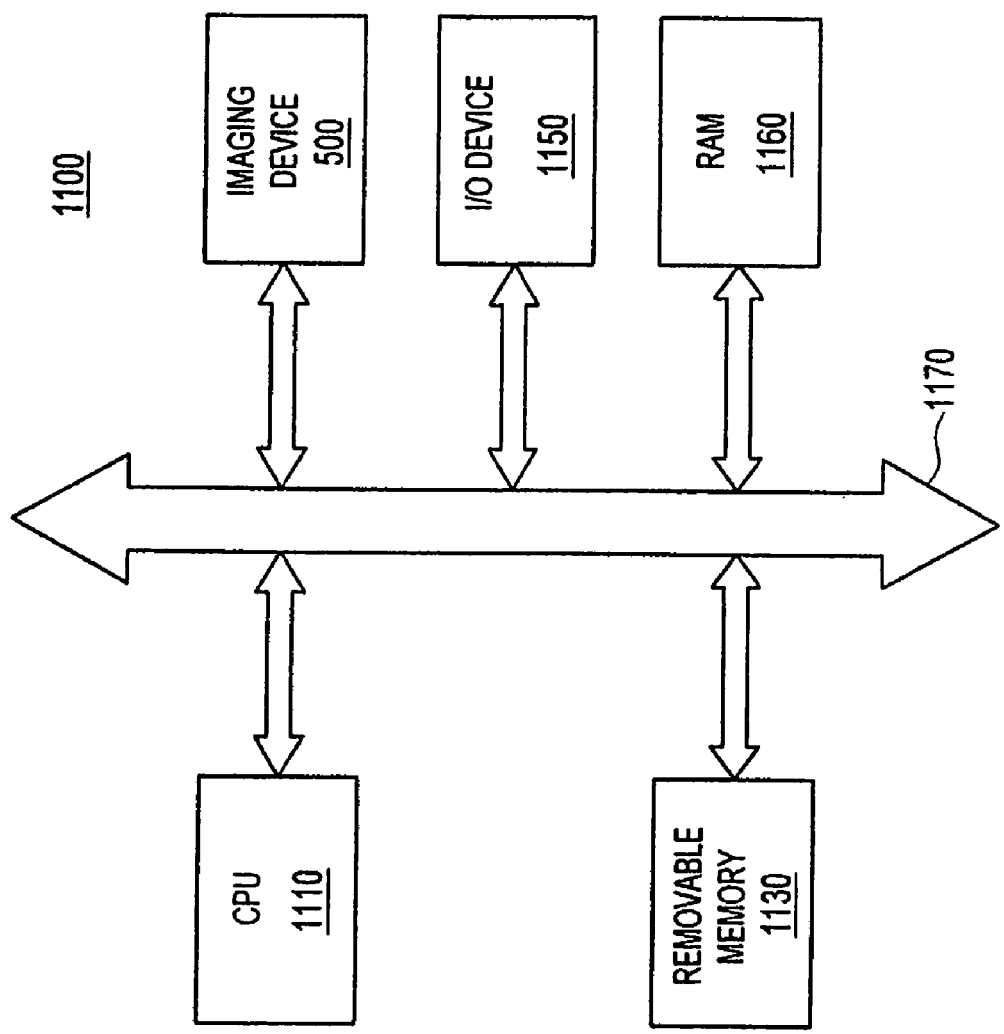

METHOD, APPARATUS AND SYSTEM PROVIDING IMAGER VERTICAL BINNING AND SCALING USING COLUMN PARALLEL SIGMA-DELTA DIGITAL CONVERSION

FIELD OF THE INVENTION

The invention relates generally to digital image processing and more particularly to a method, apparatus and system for binning and scaling of a pixel array output.

BACKGROUND OF THE INVENTION

There is a current interest in CMOS active pixel imagers for use as low cost imaging devices. A pixel circuit of a CMOS active pixel sensor (APS) is described below with reference to FIG. 1. Active pixel sensors can have one or more active transistors within the pixel, can be made compatible with CMOS technologies, and promise higher readout rates compared to passive pixel sensors. FIG. 1 illustrates a pixel 4T cell 10 in an image sensor 5, where "4T" designates the use of four transistors to operate the pixel 10 as is commonly understood in the art. A 4T pixel has a photodiode 12, a transfer transistor 11 a reset transistor 13, a source follower transistor 14, and a row select transistor 15. It should be understood that FIG. 1 shows the circuitry for the operation of a single pixel, and that in practical use there will be an M-by-N array of identical pixels arranged in rows and columns with the pixels of the array accessed using row and column select circuitry, as described in more detail below.

The photodiode 12 converts incident photons to electrons that are transferred to a storage node, such as a floating diffusion node FD, through transfer transistor 11. A source follower transistor 14 has its gate connected to node FD and amplifies the signal appearing at node FD. When a particular row containing pixel 10 is selected by the row select transistor 15, the signal amplified by transistor 14 is passed to a column line 17 to the readout circuitry. The photodiode 12 accumulates a photo-generated charge in a doped region of the substrate. It should be understood that the CMOS imager 5 might include a photogate or other photoconversion device, in lieu of a photodiode, for producing photo-generated charge.

A reset voltage source Vrst is selectively coupled through reset transistor 13 to node FD. The gate of transfer transistor 11 is coupled to a transfer control line which serves to control the transfer operation by which photodiode 12 is connected to node FD. The gate of reset transistor 13 is coupled to a reset control line, which serves to control the reset operation in which Vrst is connected to node FD. The row select control line is typically coupled to all of the pixels of the same row of the array. A supply voltage source is coupled to the source follower transistor 14. Column line 17 is coupled to all of the pixels of the same column of the array and typically has a current sink transistor 16 at one end. The gate of row select transistor 15 is coupled to row select control line.

As known in the art, for active pixel sensors of the type depicted in FIG. 1, a value may be read from pixel 5 using a two-step process. During a reset period, node FD is reset by turning on reset transistor 13, and the reset voltage is applied to node FD and read out to column line 17 by the source follower transistor 14 (through the activated row select transistor 15). During a charge integration period the photodiode 12 converts photons to electrons. After the integration period the transfer transistor 11 is then activated, allowing the electrons from photodiode 12 to collect at node FD. The charges at node FD are amplified by source follower transistor 14 and selectively passed to column line 17 by row access transistor 15. As a result, the two different values—the reset voltage (Vrst) and the image signal voltage (Vsig)—are readout from the pixel 10 and sent by the column line 17 to readout circuitry, where each voltage is sampled and held, subtracted (Vrst−Vsig), and converted into a digital value representing a pixel output.

All pixels in a row are read out simultaneously onto respective column lines 17 and stored in respective sample and hold circuits. Then the column circuitry in the sample and hold circuits are activated for reset and signal voltage readout processing.

FIG. 2 shows a CMOS active pixel sensor integrated circuit chip 2 that includes an array of pixels 5 and a controller 23 that provides timing and control signals to enable reading out of signals stored in the pixels in a manner commonly known to those skilled in the art. Arrays have dimensions of M-by-N pixels, with the size of the array 5 depending on a particular application. The array is read out a row at a time using a column parallel readout architecture. The controller 23 selects a particular row of pixels in the array 5 by controlling the operation of row addressing circuit 21 and row drivers 22 and selects columns for output by column addressing circuit 24. Charge signals stored in the selected row of pixels are provided on the column lines 17 (FIG. 1) to a readout circuit 25 in the manner described above. The pixel signals (reset voltage Vrst and image signal voltage Vsig) read from each of the columns can then be read out, sampled and held, subtracted by differential amplifier 26 and the result digitized by analog to digital converter 50. Pixel signals (Vrst, Vsig) corresponding to the readout reset signal (Vrst) and image signal (Vsig) are provided as respective inputs to the differential amplifier 26 for subtraction and subsequent processing. Alternatively, readout circuit 25 provides the two signals Vrst, Vsig to a differential analog-to-digital converter where the difference is converted to a digital value. The digitized difference signal is then sent to an image processor 80 which forms a digital image from the digital pixel array 5 signals and may also perform various image processing functions.

Some conventional analog to digital converters employ a sigma-delta architecture and employ pulse counters where the number of pulses counted at the end of a digital conversion period is the digital value representing the difference signal Vrst−Vsig, or a value correlated to that digital value. However, any one analog-to-digital conversion is not always completely accurate. For example, when an analog signal is being converted to a digital signal using sigma delta conversion, there can be a slight variation in the number of pulses that are provided representing a converted value. Thus, for an analog signal X provided to an ADC, one conversion can produce Y pulses. When at another time, that same analog signal X may convert as Y+2 pulses. At yet another time, analog signal X provided to an ADC may convert as Y−1 pulses. As such, each conversion may result in a slightly different digital representation of the analog signal X.

To increase the accuracy of the analog to digital conversion Y, sigma-delta converter which may be used in an imager to convert an analog signal to a digital signal multiple times, i.e., the output pulses are counted several times without resetting the counter. The pulse count then represents an average value over all of the multiple conversions and is then provided as the digital signal value to the image processor 80. The average of the pulse counts can be computed by continuously counting the total number of pulses for all of the multiple conversions and then dividing the total pulse count by the number of conversions, thus increasing the accuracy of the conversion.

Some conventional imagers are designed and manufactured with dual sets of readout circuits, one above of the pixel array and one below the pixel array, to help decrease the total amount of time required to read signals from the pixel array. FIG. 3 depicts a conventional imaging system 390 having a pixel array 340 having pairs of column lines of pixels with one column line of the pair being read out by an upper one of read out circuits, 350, 352, 354, 356, 358 and another column line of the pair being read out by a lower one of readout circuits, 360, 362, 364, 366, 368. Pixel array 340 is shown as set up in a Bayer pattern of red ("R"), blue ("B"), and two green ("G1","G2") pixel cells though this is not the only color pattern which may be employed. In the imaging system 390, a pair of adjoining column lines 330, 331 of pixels e.g. pixels 370-379, and 380-389 have respective lower readout circuit, e.g., 360, and an upper readout circuit, e.g., 350. Typically, all of the green pixel cells (G1, G2) of the pixel array 340 are readout by the upper (or lower) set of read out circuits, 350, 352, 354, 356, 358, whereas the red and blue pixel cells are alternatively readout by the lower (or upper) set of readout circuits, 360, 362, 364, 366, 368.

The upper readout circuits and the lower readout circuits are operated to mutually read out signals from adjoining pixels in adjacent column lines 330, 331 e.g. 371, 381 in a same row at substantially the same time. For example, when row 391 is designated for readout, green G1 pixel 381 is readout by upper readout circuit 350 at substantially the same time that red pixel 371 is readout by lower readout circuit 360.

FIG. 4 is similar to FIG. 3, but depicts the readout from the pixel array 340 when the next row 392 is read out. When row 392 is readout, the upper and lower readout circuits 350, 360, exchange column lines 330, 331 so green G2 pixel 372 is readout by upper readout circuit 350, and at substantially the same time, blue pixel 382 is readout by lower readout circuit 360. This process of alternating by row the assignments of column lines 330, 331 to the readout circuits 350, 360 continues through the readout of all rows of the pixel array 346.

One of the tasks which may be performed by a readout circuit 350, 352, 354, 356, 360, 362, 364, 366, 368 is the analog to digital conversion of the difference of the Vrst and Vsig analog signals (Vrst and Vsig) readout from a pixel. The readout circuits 350-358 and 360-368 may, as noted, use sigma-delta analog to digital conversion. A non-exclusive, examples of sigma-delta analog-to-digital converters which may be used in readout circuits 350-358, 360, 368 are disclosed in U.S. application Ser. No. 11/106,465 and 11/417,021, the disclosures of which are incorporated herein by reference.

For an N-bit conversion accuracy, a sigma-delta converter employs 2N clock cycles. Thus, if the analog-to-digital conversion accuracy is 12 bits, then $2^{12}=4096$ clock cycles are employed. During the conversion process the analog signal is repeatedly converted during the period of 4096 clock cycles to improve conversion accuracy so that at the end of the conversion period the N-bit analog-to-digital converter counter contains a count value which is the accumulation of the multiple A/D conversion and thus represents an average of the multiple conversions.

In many instances it is desirable to bin together pixel signals or scale pixel signals of an image. This is typically performed by the image processor 80 which receives the digital pixel signals for a captured image and performs the binning and/or scaling operations in a horizontal and/or vertical direction of an image. There are may other processing operations also performed by the image processor 80 and the additional binning and/or scaling operations may slow the speed of operation of an image processing pipeline implemented by the image processor 80. Accordingly, a method, apparatus and system which off loads at least some of the binning and/or scaling operations from the processing performed by image processor 80 would be desirable.

BRIEF DESCRIPTION OF THE DRAWINGS

Advantages and features of the invention will become more apparent from the detailed description of embodiments provided below with reference to the accompanying drawings in which:

FIG. 3 is a diagram illustrating a conventional readout using the FIG. 2 imaging system for one row of a pixel array;

FIG. 4 is a diagram illustrating a conventional readout using the FIG. 2 imaging system for a subsequent row of a pixel array;

FIG. 9 is a diagram of a portion of a pixel array showing combined pixels formed from four pixels in accordance with a modification of the first embodiment;

FIG. 10 is a diagram of a portion of a pixel array of the imaging device of FIG. 6 showing combined pixels formed from three pixels in accordance with the first embodiment;

FIG. 17 is a block diagram of a processor system, for example, a camera system incorporating an imaging device in accordance with different embodiments.

DETAILED DESCRIPTION OF THE INVENTION

In the following detailed description, reference is made to the accompanying drawings, which are a part of the application, and in which is shown by way of illustration various embodiments. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

In various embodiments, a new imager readout architecture is provided which performs at least some binning and/or scaling operations in the readout and analog to digital conversion circuits, relieving an image processor, e.g. image processor 80, from the task of performing these operations.

Figure 5:
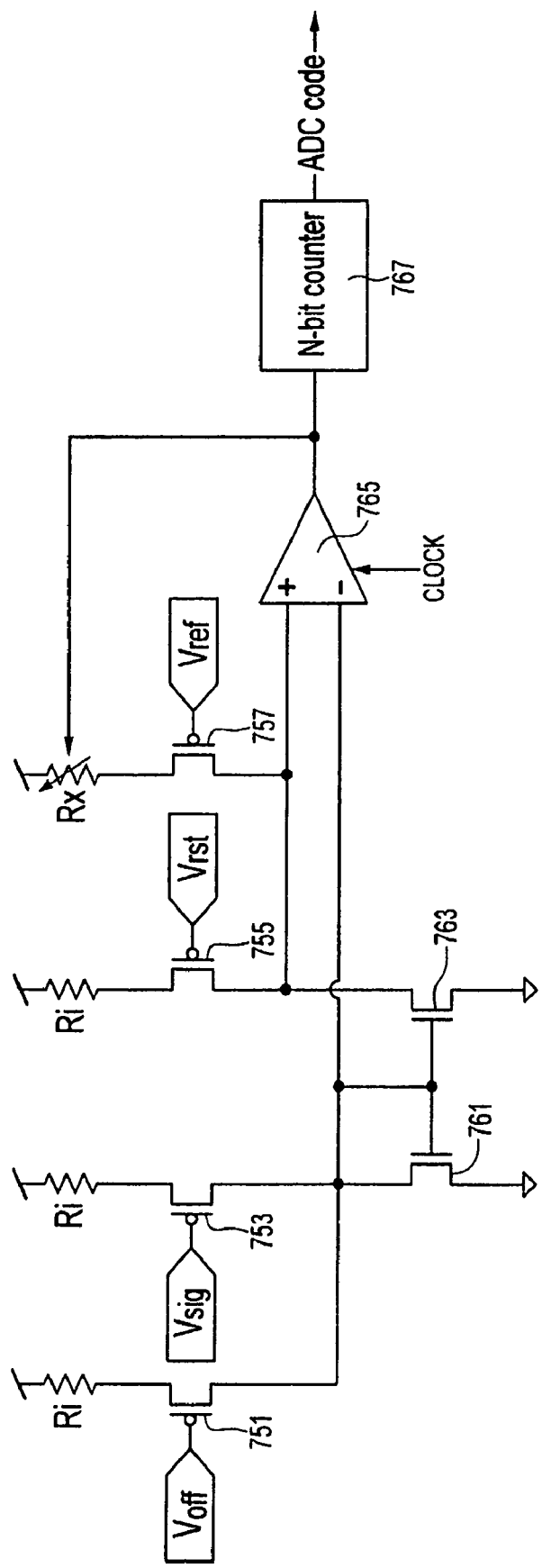
FIG. 5 is a schematic diagram of an analog-to-digital sigma-delta converter which may be used in the readout circuits depicted in FIGS. 3 and 4.

Before describing the embodiments in detail a brief description of a simplified readout circuit containing a differential amplifier for subtracting the pixel Vrst, Vsig signals and a sigma-delta analog-to-digital converter is described with respect to FIG. 5. This circuit is described in greater detail in application Ser. No. 11/417,021 the disclosure of which is incorporated herein by reference. FIG. 5 corresponds to the simplified circuit shown in FIG. 5B of application Ser. No. 11/417,021, while 5A of that application discloses the circuit in greater detail. The FIG. 5 simplified circuit contains four p-channel current control transistors 751, 753, 755 and 757. One of the source/drain terminals of transistors 751, 753, 755 is connected to a respective resistance Ri which is in turn connected to a voltage supply VAA. The other source/drain terminal of transistors 751, 753 is connected to a source/drain and gate terminal of N-channel transistor 761 and to a negative input of differential amplifier 765. Transistor 751 receives an offset voltage Voff at its gate, while transistor 753 receives pixel image signal Vsig at its gate. The other source/drain terminal of transistor 761 is connected to a ground terminal.

Transistor 755 has another source/drain terminal connected to a source/drain terminal of transistor 763 and to a positive input of differential amplifier 765. The gate of transistor 755 receives the signal Vrst.

Transistor 757 has one source/drain terminal connected to a variable resistance Rx which is connected to voltage supply VAA and has another source/drain terminal connected to the positive input of clock controlled differential amplifier 765. The gate of transistor 757 receives a reference voltage Vref.

The other source/drain terminal of transistor 763 is connected to ground and the gate of transistor 763 is coupled to the gate of transistor 761 and the negative input of differential amplifier 765.

The output of differential amplifier 765 is connected to N-bit counter 767, which provides a digitized count value representing (Vrst−Vsig) as adjusted by Voff and Vref. The output of differential amplifier 765 is also connected through a digital to analog converter in a feedback loop to control the value of resistance Rx.

As described more fully in application Ser. No. 11/417,021, the FIG. 5 circuit performs the subtraction of the signal Vsig from the signal Vrst (as adjusted by Voff and Vref) and digitization of that value a repeated number of times to provide an accumulating count value in counter 767 which represents the accumulated counts of all conversions and thus an average of all conversions during the period of operation of N-bit counter 767. For a 12-bit accuracy counter 767 will operate over $2^N$ clock cycles to obtain the multiple conversions and produce the accumulated digital count value.

Figure 6:
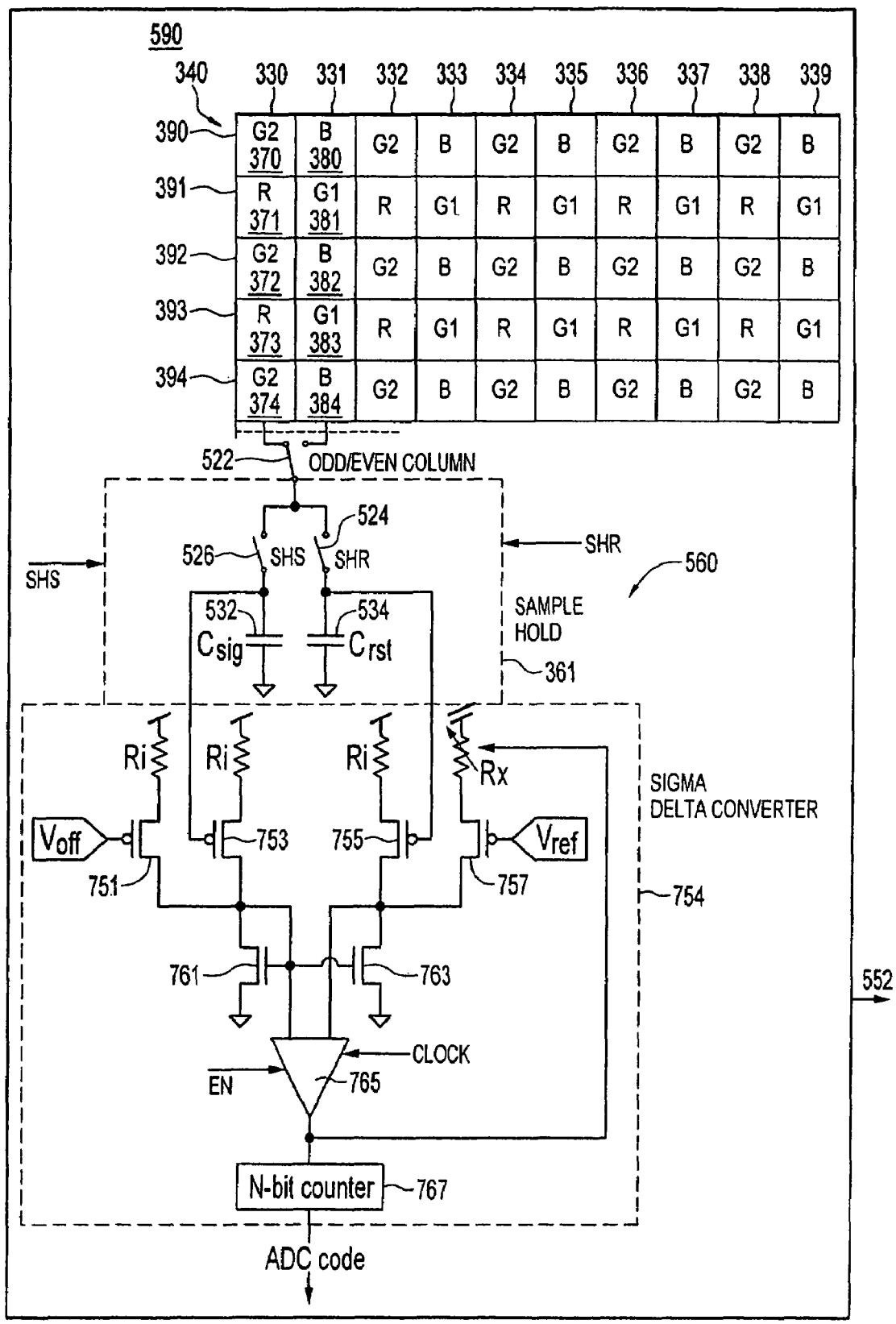
FIG. 6 is a block diagram of a portion of an imaging device in accordance with a first embodiment of the invention.

FIG. 6 depicts a portion of an imager device 590 in accordance with a first embodiment which implements a vertical binning of an imager pixel array 340. Binning is used to reduce the resolution of the imager by combining signals from multiple closely located pixels of the same color in a same column. For example, in a selected column, e.g. 330 the signals from a red pixel of the Mth row 391 of the column may be connected with signals from a red pixel in an M+2th row 393 of the column. Integer binning refers to combining an integer number of pixel signals to form a combined pixel. When performing integer binning of Z pixels, each pixel contributes 1/Z of the total signal of the combined pixel. Thus, when performing integer binning of two (2) pixels, each pixel contributes ½ of the total signal of the combined pixel.

Figure 1:
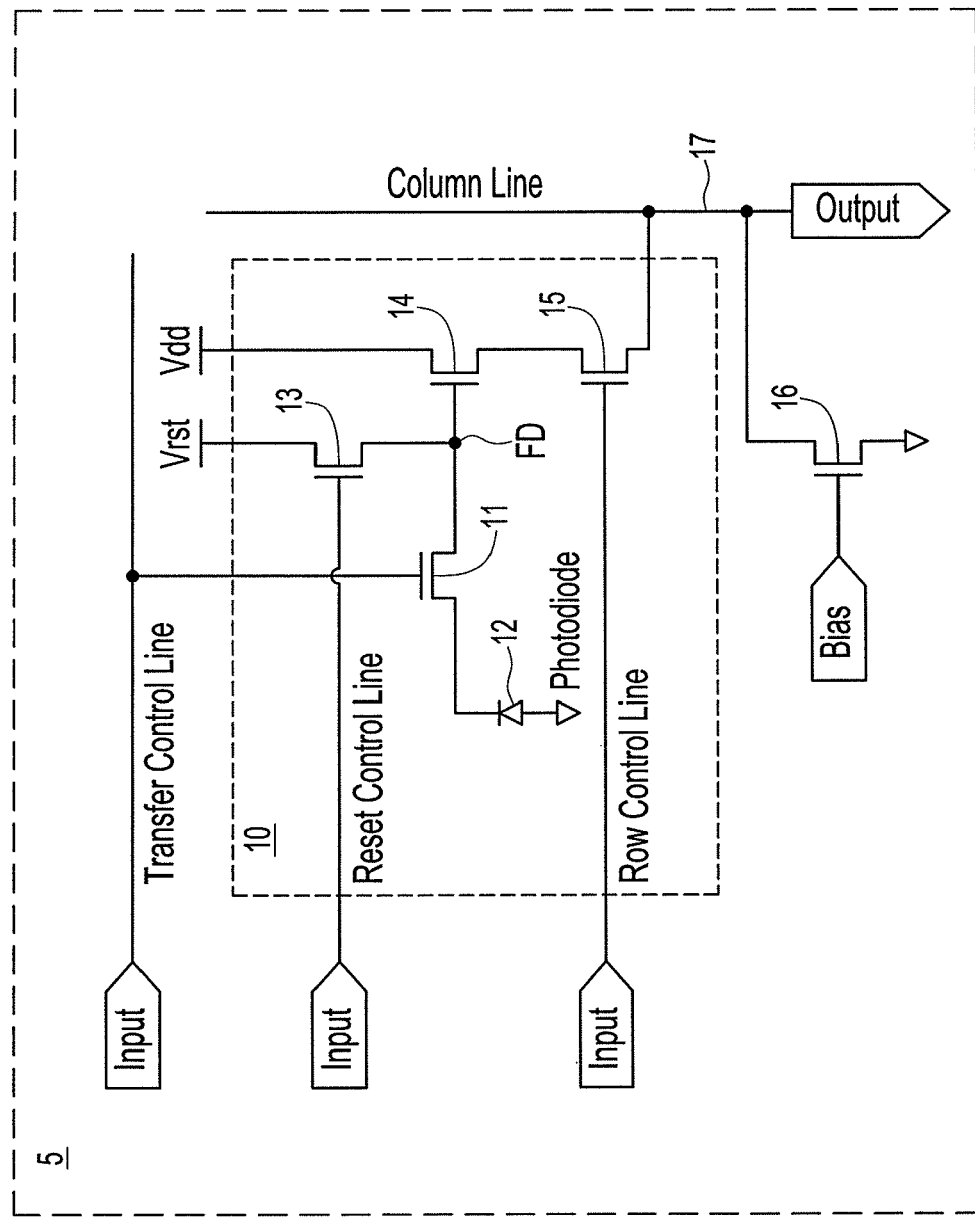
FIG. 1 is a block diagram of a conventional four transistor active pixel cell.
Figure 2:
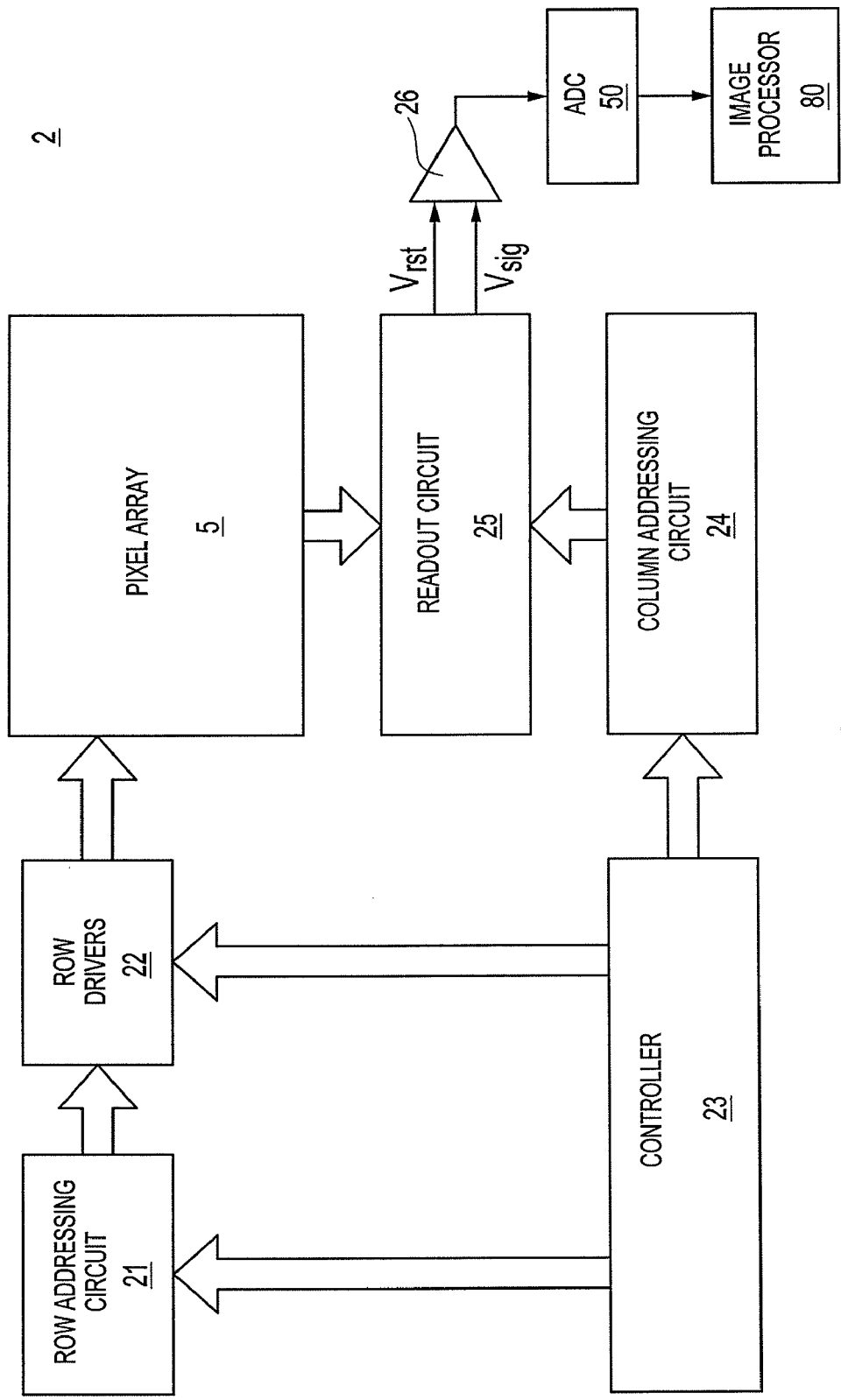
FIG. 2 is a block diagram of a conventional imaging system.

Imager device 590 has the overall system construction illustrated in FIGS. 1 and 2, but a different readout circuit 560 which replaces the readout circuit 25, differential amplifier 26 and analog to digital converter 50 shown in FIG. 2. Imager device 590 includes a pixel array 340 and a readout circuit 560 above and below the pixel array 340 in the manner illustrated in FIGS. 3 and 4. Pixel array 340 has many pixel rows and columns, although only five (5) rows 390-394 and ten (10) columns 330-339 are depicted. FIG. 6 also only shows one example of a readout circuit 560, using the combined differential amplifier and sigma-delta analog to digital converter circuit illustrated in FIG. 5. The pixel array 340 is laid out in a Bayer pattern, though this is not necessary. Readout circuit 560 is switchably associated with columns 330, 331. Although only one readout circuit 560 is depicted, it is representational of a plurality of readout circuits used in place of the readout circuit 350-358, 360-368 depicted in FIGS. 3 and 4 above and below the pixel array 340 and associated with pairs of columns of pixels. Also not depicted in FIG. 6, are the readout circuits above pixel array 340, similar to the arrangement of readout circuits depicted in FIGS. 3 and 4. Readout circuit 560 reads out signals from the red and blue pixels of columns 330, 331.

Readout circuit 560 includes switch 522 for selectively, mutually exclusively coupling readout circuit 560 to one of columns 330, 331 of the pixel array 340. Capacitor 532 stores an charge accumulated signal Vsig of a pixel received from the pixel array 340 while capacitor 534 stores a reset signal value Vrst of a pixel received from the pixel array 340. The stored signal Vsig is connected to the gate of transistor 753 while the stored signal Vrst is connected to the gate of transistor 755. The gate of transistor 751 is connected to receive the offset signal Voff. Transistors 751, 753 apply Vsig, as connected by the offset signal Voff to the negative input of differential amplifier 765, while transistors 755, 757 apply Vrst, Vref as a combined signal to the positive input of differential amplifier 767.

As described with reference to FIG. 5, the readout circuit 560 provides in counter 767 an average digital value representing multiple conversions of the difference signal (Vrst−Vsig) as adjusted by Voff and Vref. It should be noted that although the FIG. 5 sigma-delta analog to digital connector uses signal paths for an offset voltage Voff and a signal path for a referred voltage Vref, these signal paths may be omitted. Indeed, other sigma-delta analog to digital converters which may be used are also described in application Ser. No. 11/417,021. The signal paths for Vrst and Vsig may be employed with or without additional signal paths for offset, reference, or other corrections. For simplification of description, in the embodiment discussed herein only the signals Vrst and Vsig are discussed, but it should be understood that offsets and reference voltages may be used with signals Vrst and Vsig may be used in various embodiments.

In order to implement vertical binning of, for example two color pixels, each pixel supplies as an input Vsig, Vrst signals for one-half of the total conversion time for readout circuit 560. As one example, for an N=12 bit conversion, $2^N$=4096 clock cycles are required for operation. For a two-pixel color binning, each color pixel will be applied to readout circuit 360 for one-half of the total clock cycles. Thus, if readout circuit 360 is connected to column 330 and is binning red pixels 371 and 373, for one-half of the clock cycles of the conversion period the red pixel 371 signals Vrst, Vsig are applied to sample and hold circuit 361 capacitors 534, 532. Thereafter, the pixel 373 signals are applied to capacitors 534, 532. Because each of the output signals for red pixels 371 and 373 are applied for one-half of the total conversion period, during which multiple conversions of the applied Vrst, Vsig signals occur, the end result is that counter 767 holds a digital value representing the average of the pixel outputs for pixels 371 and 373. In order to apply the signals from pixels 371 and 373 in succession to readout circuit 360, the controller 23 which controls the readout of the pixel rows is arranged to output row M(e.g. 391) and then row M+2 (e.g. 393), each during one-half of the conversion period of the readout circuit 560.

Referring back to FIG. 2 overall system controller 23 also includes a counter controller for controlling the operation of the sigma-delta converter 754 of this N-bit counter 767. The counter controller is responsible for determining the appropriate number of clock cycles to count the pulses from the differential amplifier 765 to a digital signal representing the analog signal so that the accumulated value in counter 767 represents the average of all the conversions.

Figure 7:
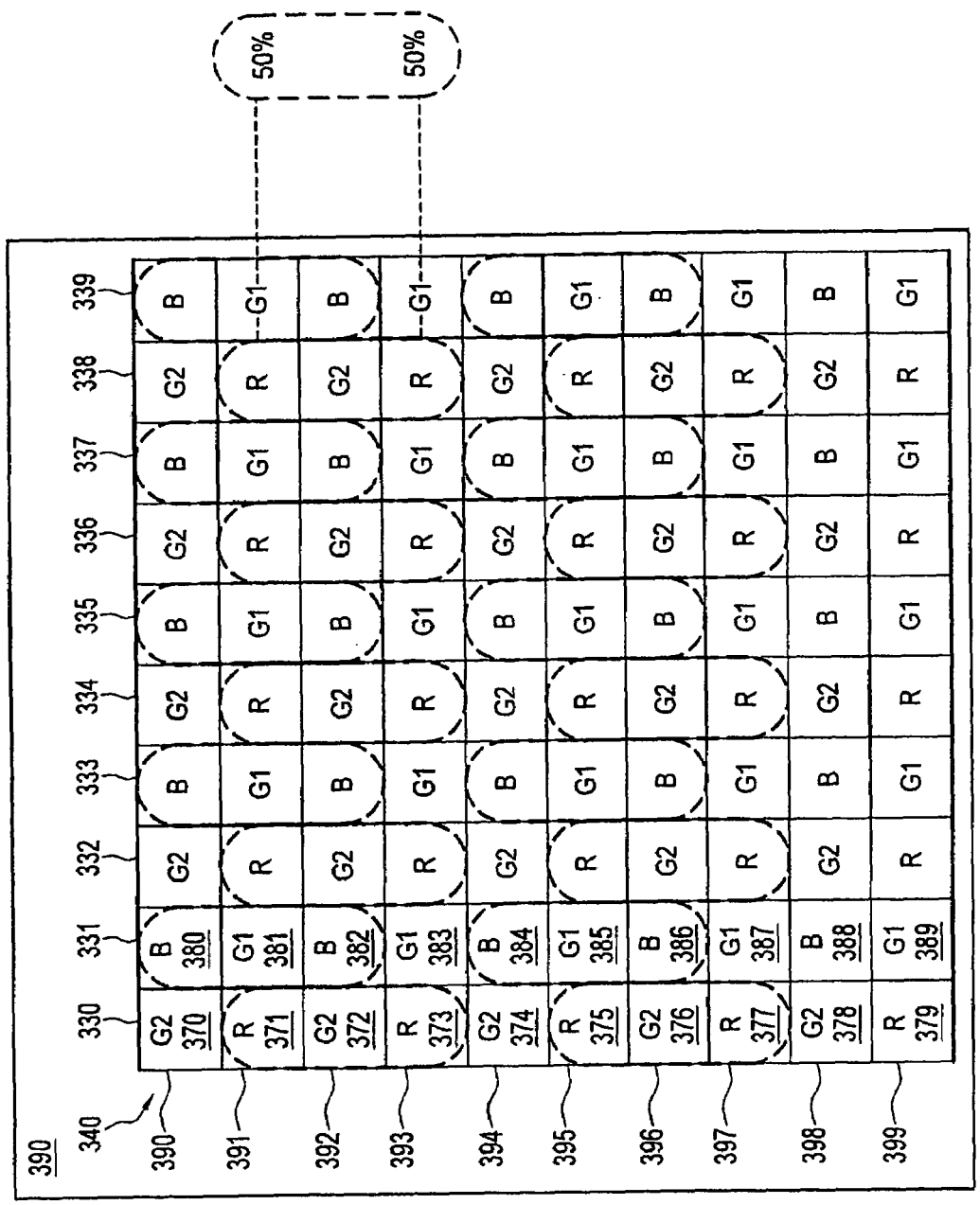
FIG. 7 is a diagram of a portion of a pixel array of the imaging device of FIG. 6 showing combined pixels formed from two array pixels in accordance with the first embodiment of the invention.

In the operation of the imaging system 590 of FIG. 6 to perform vertical integer binning of 2×1, signals from two pixels in a column are combined. A vertical 2×1 binning is depicted in FIG. 7 which shows a portion of the pixel array 340 of FIG. 6. To vertically bin, a repeating pattern is applied for combining pixels in a column to form a combined pixel. For 2×1 binning, adjacent pixels of the same color in a same column are combined to a form combined pixel. In integer 2×1 binning, each pixel would contribute half of the combined pixel digital output signal.

An example of vertical binning, the combination of red pixels in column 330 from red pixels of rows 391 and 393 has been described. Likewise, red pixels 375 and 377 are combined. To vertically bin blue pixels in column 331 when readout circuit 560 is connected to column 331, the signals from blue pixel 380 are combined with the signals from blue pixel 382. Likewise, blue pixels 384 and 386 are combined. This pattern of combining red and blue pixels is repeated throughout the columns and rows of the array.

The green pixels are likewise binned in a readout circuit, e.g., 350 in FIG. 3 at the top of the pixel array 340 in similar manner. Thus, referring again to FIG. 7, to vertically bin green pixels ("G2") in column 330, the signals from green G2 pixel of row 390 are combined with the signals from green G2 pixel row 392. For column 331, the green G1 pixels from rows 391 and 393 are combined. This pattern of binning the red, blue and two green pixel signals is repeated through the columns and rows of the array.

As indicated above, in a 12-bit counter converting an analog signal to a digital representation of the signal takes 4096 clock cycles. In the operation of the embodiment for integer binning of 2 pixels in a readout circuit, processing of each of the two analog signals in the N-bit counter 538 will take half of the 4096 clock cycle conversion period, hence 2048 clock cycles which are applied to differential amplifier 765.

Figure 8:
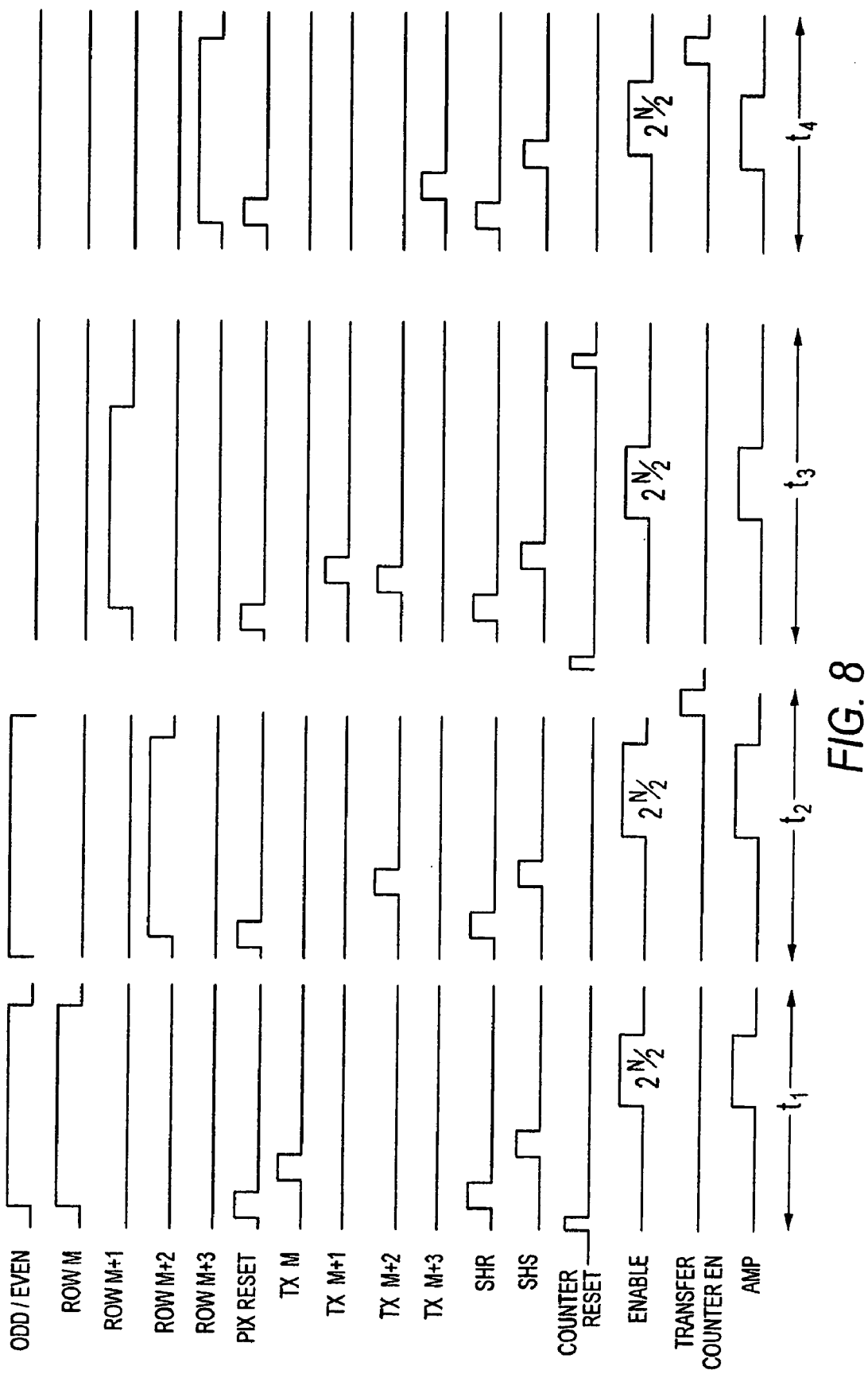
FIG. 8 is a timing diagram depicting an operation of the imaging device of FIG. 6 to attain the pixel combination depicted in FIG. 7.

FIG. 8 illustrates one example of the timing of pixel readout and operation of the readout circuit 560 of FIG. 6 to combine pixels in the manner shown in FIG. 7. Although the following discusses the readout from a pair of columns 330, 331, it is representational of the readout of red, blue, green (G1) and green (G2) pixels from all columns pairs throughout the pixel array 340.

During a time period t1, a COUNTER RESET signal is first provided to the N-bit counter 767 (FIG. 6) thereby resetting the count within. Subsequently, an odd/even signal is enabled logic level high thereby coupling readout circuit 560 to odd column 330 via switch 522. Row select line of row M, e.g. 591, is enabled thereby coupling red pixel 371 to the readout circuit 360 through column line 330. A pixel reset signal PIX RESET applied to reset transistor 13 resets the pixel 371 and an SHR signal is enabled logic level high, thereby closing switch 524 and coupling capacitor 534 to the column line 330. The reset signal Vrst from pixel 371 is thus transferred to the capacitor 534, and then the SHR signal is disabled thereby opening switch 524 and uncoupling capacitor 534 from the column line 330. A transfer control signal for Tx for row M is pulsed logic level high, thereby allowing a signal stored in a photodiode 12 of pixel 371 to be transferred to the floating diffusion region FD of the pixel 371. (FIG. 1)

A SHS signal is enabled logic level high, thereby closing switch 526 and coupling capacitor 532 to the column line 330. The charge accumulation signal Vsig from pixel 371 is transferred to the capacitor 532, and then the SHS signal is then disabled thereby opening switch 526 and uncoupling capacitor 534 from the column 330.

A differential amplifier enable signal ENABLE is enabled logic level high thereby enabling differential amplifier 765 of signal delta converter 754 to subtract and repeatedly digitize the signals Vrst and Vsig and produce a stream of pulses to counter 767 which holds an average digital value of Vrst–Vsig. In this integer binning, the N-bit counter 767 is enabled for $2^N/2$ cycles, half the total connection time of sigma-delta converter 754, after which the ENABLE signal is no longer provided. At this point, capacitors 534 and 532 are cleared using known techniques and row M+2, e.g. 393, is activated and reset Vrst and image signals Vsig for red pixel are 373 are loaded into capacitors 534 and 532 during time period t2.

Thus, during time period t2, PIX RESET resets pixel 373. The pixel reset value Vrst is sampled onto capacitor 534 with the signal SHR. Then the pixel image signal Vsig is transferred from photo diode 12 to the floating diffusion region FD and sampled onto capacitor 532 with the signal SHS.

The differential amplifier 765 of the sigma delta converter 754 is thus enabled by the signal ENABLE and a conversion of the Vrst–Vsig differential signal for pixel 373 occurs with a N-bit counter 767 continuing to count clock pulses as the Vrst–Vsig differential signal from pixel 373 is repeatedly converted to a digital count value. In this two pixel integer binning, the N-bit counter 767 is enabled for 2.sup.N/2cycles during time period t2, after which the ENABLE signal is no longer provided to the N-bit counter 538.

At the end of the time period t2 the N-bit counter 767 now stores a total count value which represents the average of the pixel differential signals Vrst–Vsig from pixels 391 and 393.

While readout circuit 360 is sampling, converting and averaging pixel values for red pixels 371 and 373, a like readout circuit at the top of the pixel array, e.g., readout circuit 360 (FIG. 3, 4) is averaging the green G1 pixel signals from pixels 381 and 383.

At time period t3 the odd/even select signal causes readout circuit 560 to connect through switch 522 to column line 331. Likewise, the readout circuit, 560 at the top of the pixel array 340, is connected to column 330. Now readout circuit 560 receives sampled Vrst, Vsig values from the blue pixel 382 in row M+1, e.g. 392, which are sampled into readout circuit 560 and digitized multiple times in the manner of red pixel 371 described above. While this is occurring a like readout circuit 560 at the top of pixel array 340 is receiving sampled Vrst, Vsig values from green G2 pixel 372, producing in counter 767 of the upper readout circuit a digitized multiple converted value for the G2 pixel.

After time period t3, the blue pixel 384 in row M+3, e.g. row 394, is sampled during time period t4 and the Vrst, Vsig values are sampled and stored in the readout circuit 560 and the differential value Vrst–Vsig is converted multiple times and the corresponding count values added to those of pixel 382 in counter 767. After time period t4 counter 767 holds a converted value representing the average of signals from blue pixel 382, 384.

During the time periods t3 and t4 the readout circuit 560 at the top of this array is sampling, storing and multiply converting values for the green G2 pixels 372 and 374 so that the counter 767 of this upper readout circuit holds a digital value representing the average of the Vrst–Vsig signal for green pixels 372, 374.

After each pair of pixels is binned, e.g. 371, 373 and 381, 383 at the end of t2, and 382, 384 and 372, 374 at the end of t4, the contents of the respective counters 767 are sent to the image processor (FIG. 2) as the average binned values for the respective binned pixel pairs.

Figure 9:
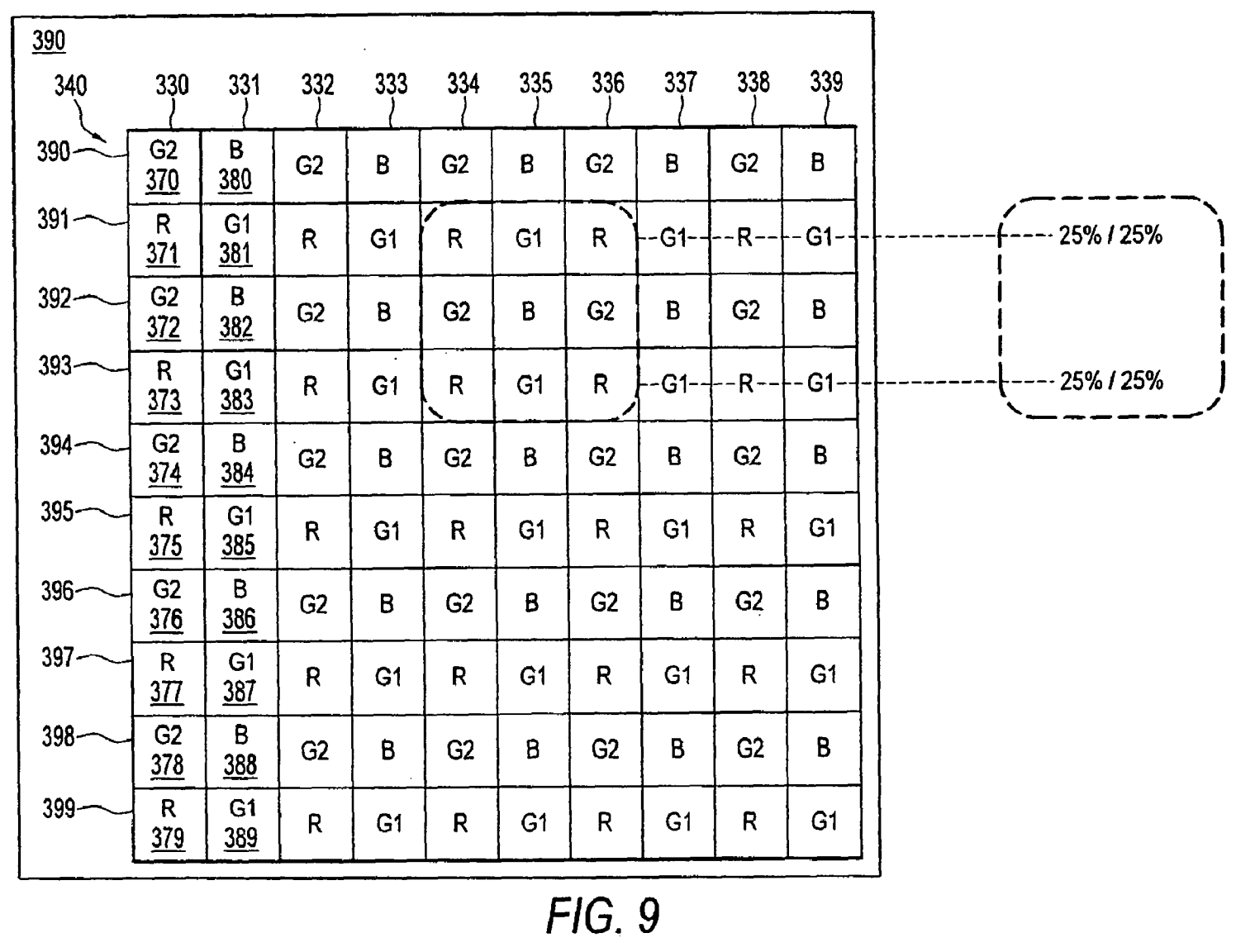

The binning of pixel cells described above in connection with FIGS. 6-8 is a 2×1 vertical binning. Binning can be extended into the horizontal direction of array 340 as well. FIG. 9 depicts 2×2 binning, where two signals from two pixels in a column are combined with two signals from two pixels in an adjacent column. For example, in one of the 2×2 binnings, signals from four red pixels cells are combined. Thus, the signals from red row 391, column 334 is combined with red row 391, column 336, and red row 393, column 334, and red row 393, column 336. This pattern of combining the red pixels would be applied across the pixel array. Similar patterns of combining blue and green pixels would similarly be applied across the pixel array. In integer 2×2 binning, each pixel would contribute one fourth of the combined signal. The circuitry and process described above with reference to FIGS. 6-8 can obtain a vertical 2×1 binning, while the image processor 80 receives the vertical binned signals and from those signals produces a horizontal binning by combing the 2×1 binned signals, e.g. red pixels, in column line 334 with the 2×1 binned signals, e.g., red pixels in column line 336.

Figure 10:
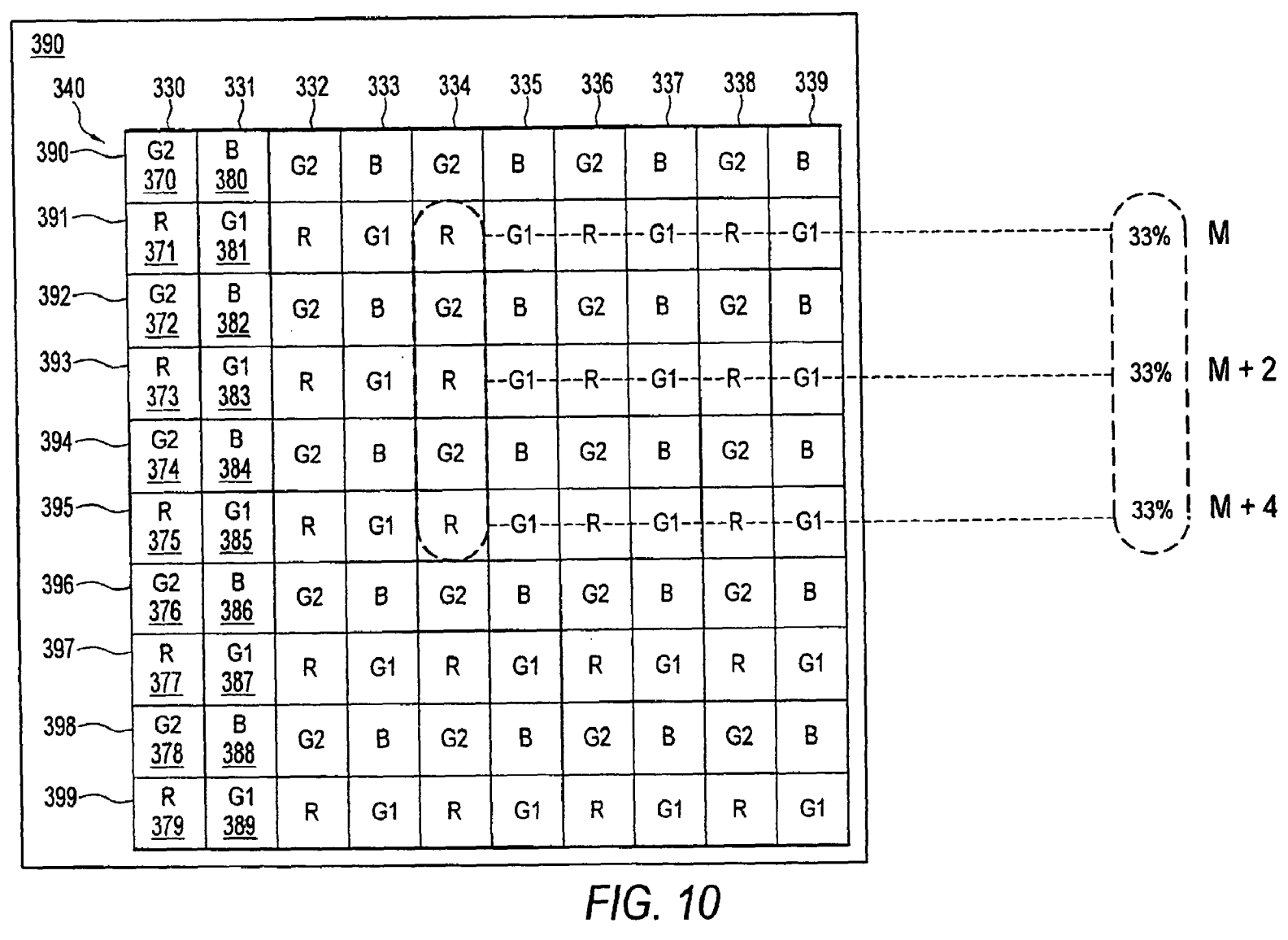

The vertical integer binning, as described with respect to FIG. 6-8 can easily be extended to any number of integer rows. For example, as depicted in FIG. 10, 3×1 vertical integer binning is depicted. In this application, the signals from three pixels in three different rows M, M+2, M+4 of a column are combined. Thus, red pixels in rows 391, 393, 395 of column 334 are combined. In this vertical integer binning, each of the pixels would contribute one third of its signal to the combined pixel signal, and the $2^N$ clock cycles of the counter 761 are divided by the integer, e.g. 3, used for binning. Thus each ENABLE signal of FIG. 8 would be enabled for $2^N/3$ clock cycles of sigma-delta converter 754.

In another embodiment, non-integer vertical binning can be obtained. This is often called image scaling. In the above description of integer binning, each row contributes equally to the resulting combined pixel signal. However, at times, it is desirable to use scaling resolutions that result in having a non-integer ratio among combined pixels of different rows.

Figure 11:
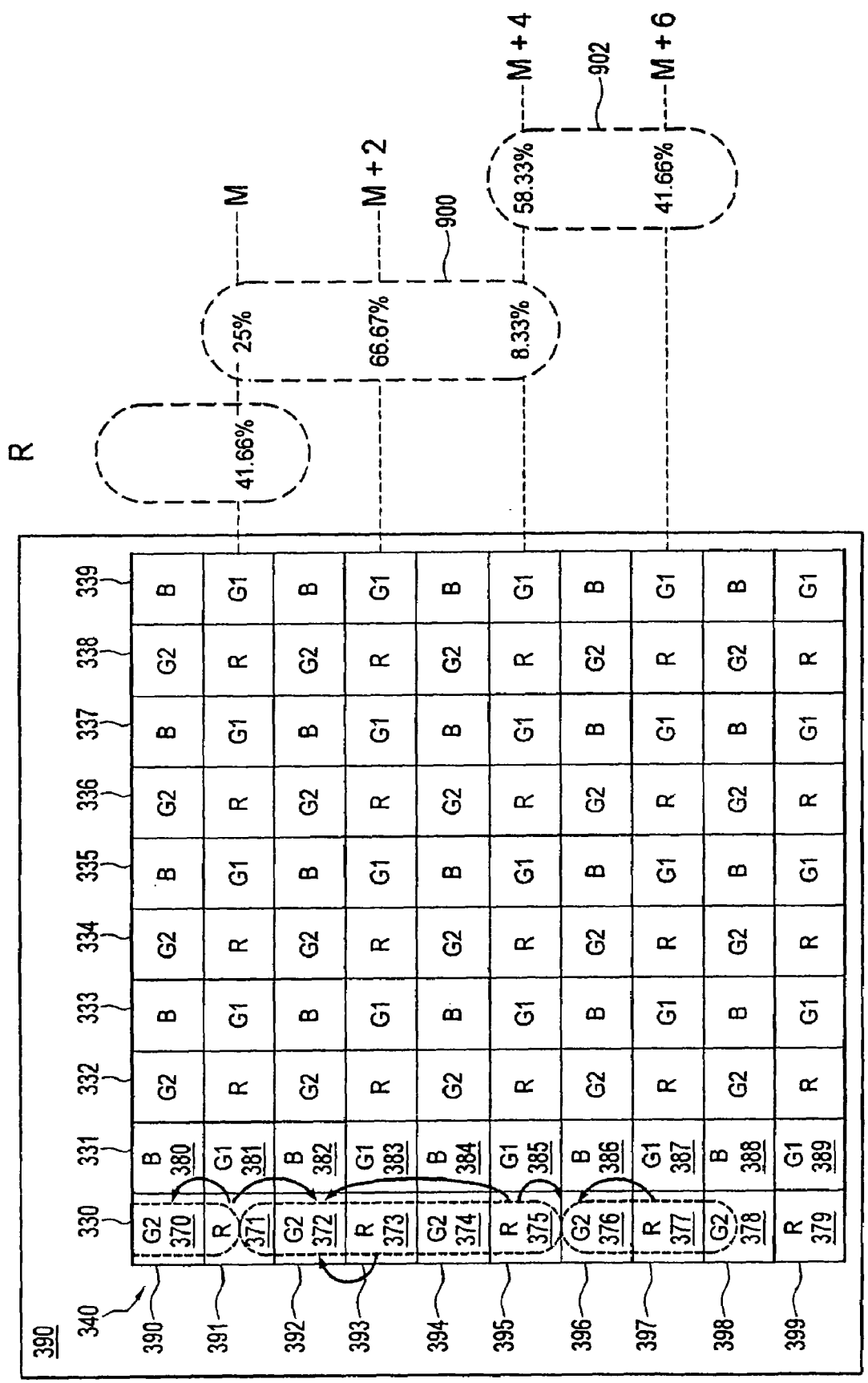
FIG. 11 is a diagram of a portion of a pixel array showing combined pixels formed from two and three array pixels in accordance with the second embodiment.

FIG. 11 shows one example of arbitrary vertical scaling which may be obtained with a second embodiment described below. In this example, a 1.5 scaling of pixels is employed. With arbitrary scaling a pixel center in a scaled image may no longer correspond to an actual physical location of a pixel of an array 340. For a given color, e.g. red as shown in FIG. 11, red pixels in 2 or 3 rows are combined to obtain a 1.5 scaling, depending on location of the pixels in a column. A red image pixel 900, for example, represents the combination of actual red pixel signals from pixels, rows 371, 373 and 375 of column 330 (rows M, M+2, M+4). Pixel 371 contributes 25%; pixel 373 contributes 66.67% and pixel 375 contributes 8.33% to the red value of red image pixel 900. For red image pixel 902, red pixel in row 395 M+4 contributes 58.33%, while red pixel in row 377 M+6 contributes 41.66% of the total value. Thus for image pixel 902 two actual red pixels are combined. For combining pixel signals in the various proportions, each pixel in the combined pixel has an associated percentage of the total clock cycles $2^N$ of an analog to digital converter 754 during the analog-to-digital conversion process. These percentage values are generated by a vertical scaling co-efficient generator or are stored in a lookup table in association with a scaling factor.

The vertical scaling coefficient generator or look up table may be part of or associated with an image processor, e.g. an image processor 80, or another control processor, e.g. a camera processor, such as 1001 described in greater detail below. The vertical scaling co-efficient generator determines, based on known formulas, the number of clock cycles required per row based on the vertical scaling (e.g., 1.5×), N, and the color type of pixel (e.g., R, B, G1, G2) and location of the pixel in the pixel array. Each pixel in each row will have an assigned number of clock cycles of a conversion period for the analog to digital conversion. As a result, the count value accumulated in counter 767 represents a combined pixel with the proportionality needed for a particular selected scaling value.

A significant difference between the integer binning discussed with reference to FIGS. 6-10 and arbitrary scaling is that some of the signals from some pixels of the array may be used in two different combined pixels in arbitrary scaling. For example, as seen in FIG. 11, for one red image pixel 900, 25% of the digital value is contributed by red pixel 371, while red pixel 373 and red pixel 375, respectively contribute 66.67% and 8.33% to the combined pixel. Additionally, for image pixel 902 red pixel 375 contributes 58.33% while red pixel 377 contributes 41.66% to the combined image pixel. This pattern of taking percentages from the different red pixels (41.66%/58.33% alternating with 25%/66.67%/8.33% in the column is repeated up and down all the columns of the pixel array 390. Other patterns for the other colored pixels (e.g., B, G1, G2) for other scaling patterns can be easily determined by those skilled in the art.

Figure 12:
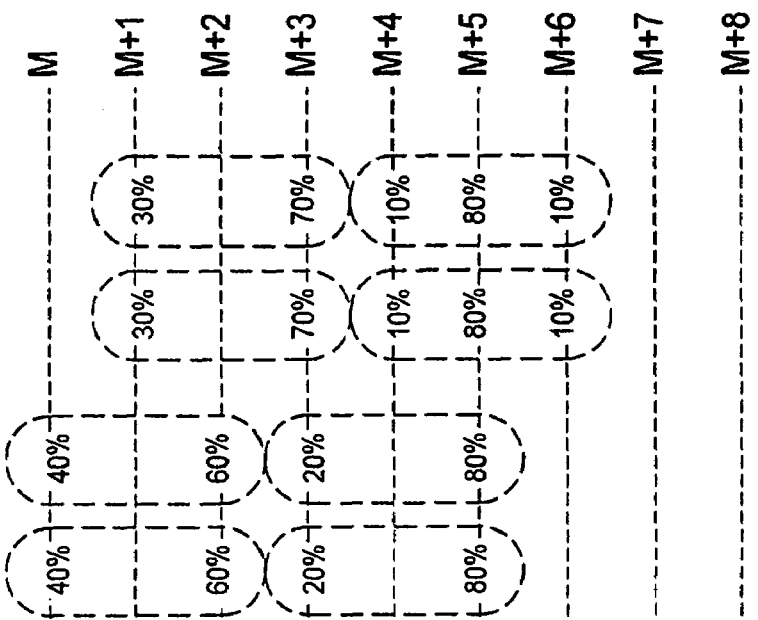
FIG. 12 is a diagram of a portion of pixel array showing another way of forming combined pixels from two and three array pixels in accordance with a second embodiment.

For different vertical scaling patterns, the scaling coefficients may be different for different colors. FIG. 12 shows an example of a 1.25× scaling applied to a pixel array based on a Bayer pattern to form combined pixels. For the combined pixels from red pixels in columns of the pixel array there is a repeating pattern of 40%/60% pixel combining alternating with 20%/80% pixel combining. Similarly in the combined pixels from G1 pixels in columns of the pixel array there is a repeating pattern of 40%/60% combining alternating with 20%/80% combining. The combined pixels from blue pixels in columns of the pixel array is done on a repeating pattern of 30%/70% pixel combining alternating with 10%/80%/10% pixel combining. Similarly, combined pixels from G2 pixels in columns of the pixel array are done on a repeating pattern of 30%/70% pixel combining alternating with 10%/80%/10%.

Figures 13, 13A:
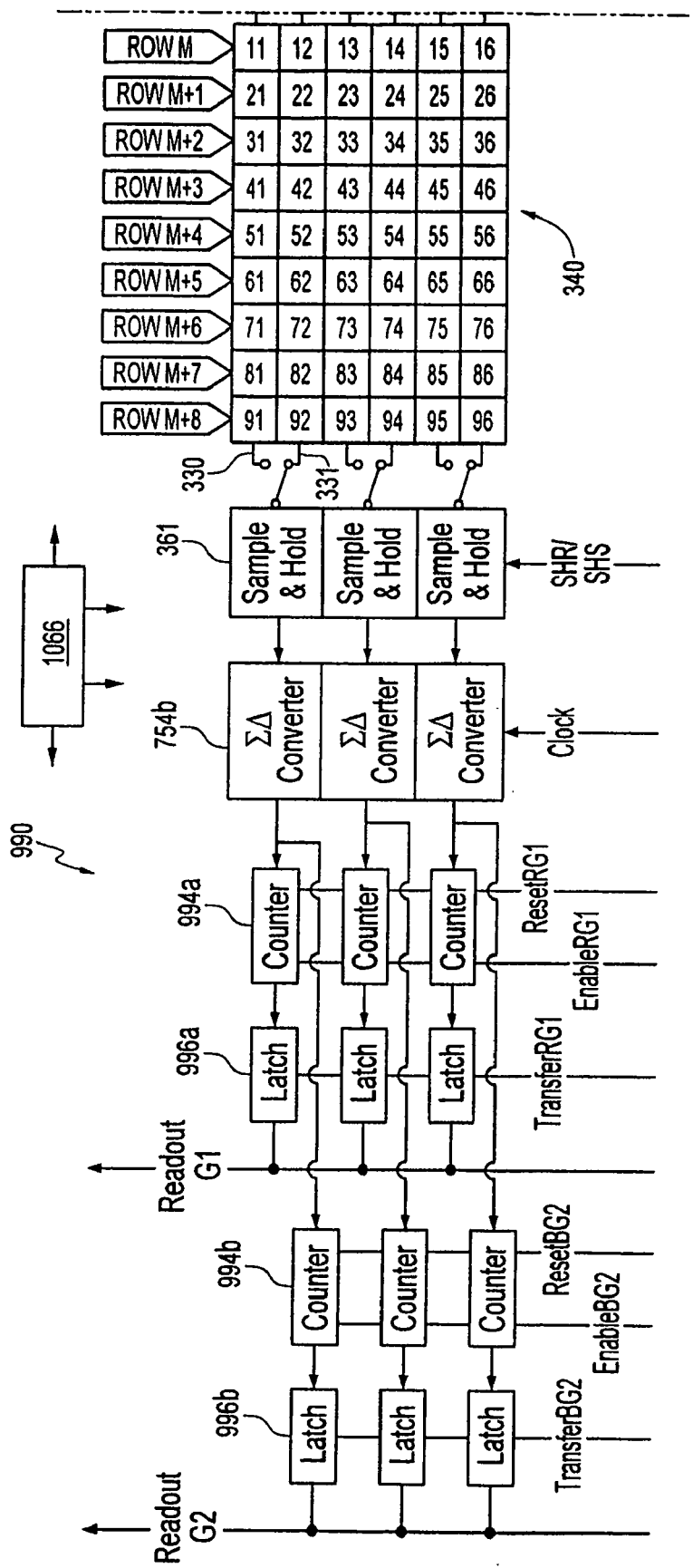
FIG. 13 (which includes FIG. 13A, 13B) is a block diagram of an imaging system in accordance with a second embodiment.
Figures 13, 13B:
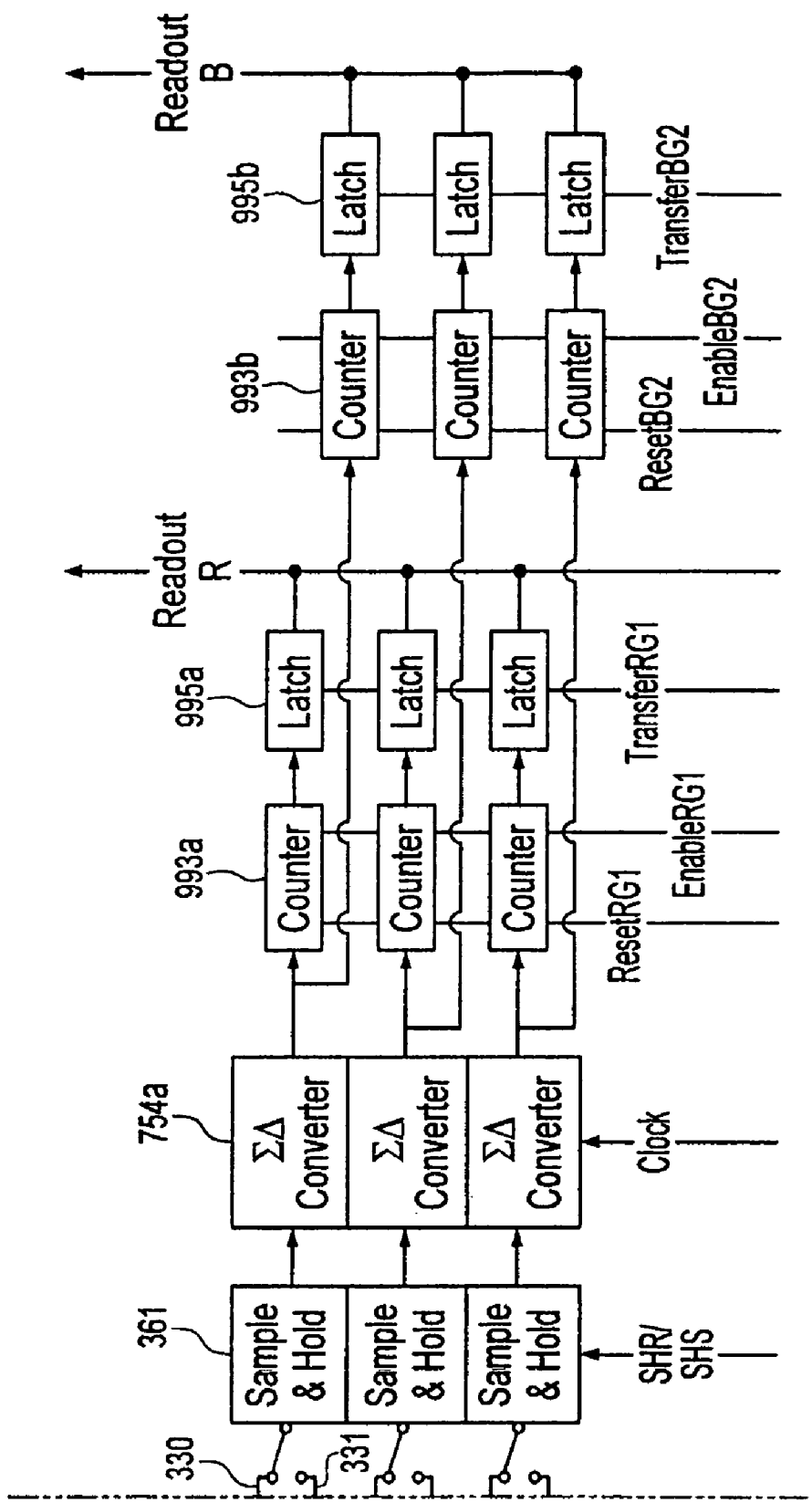
Figure 14:
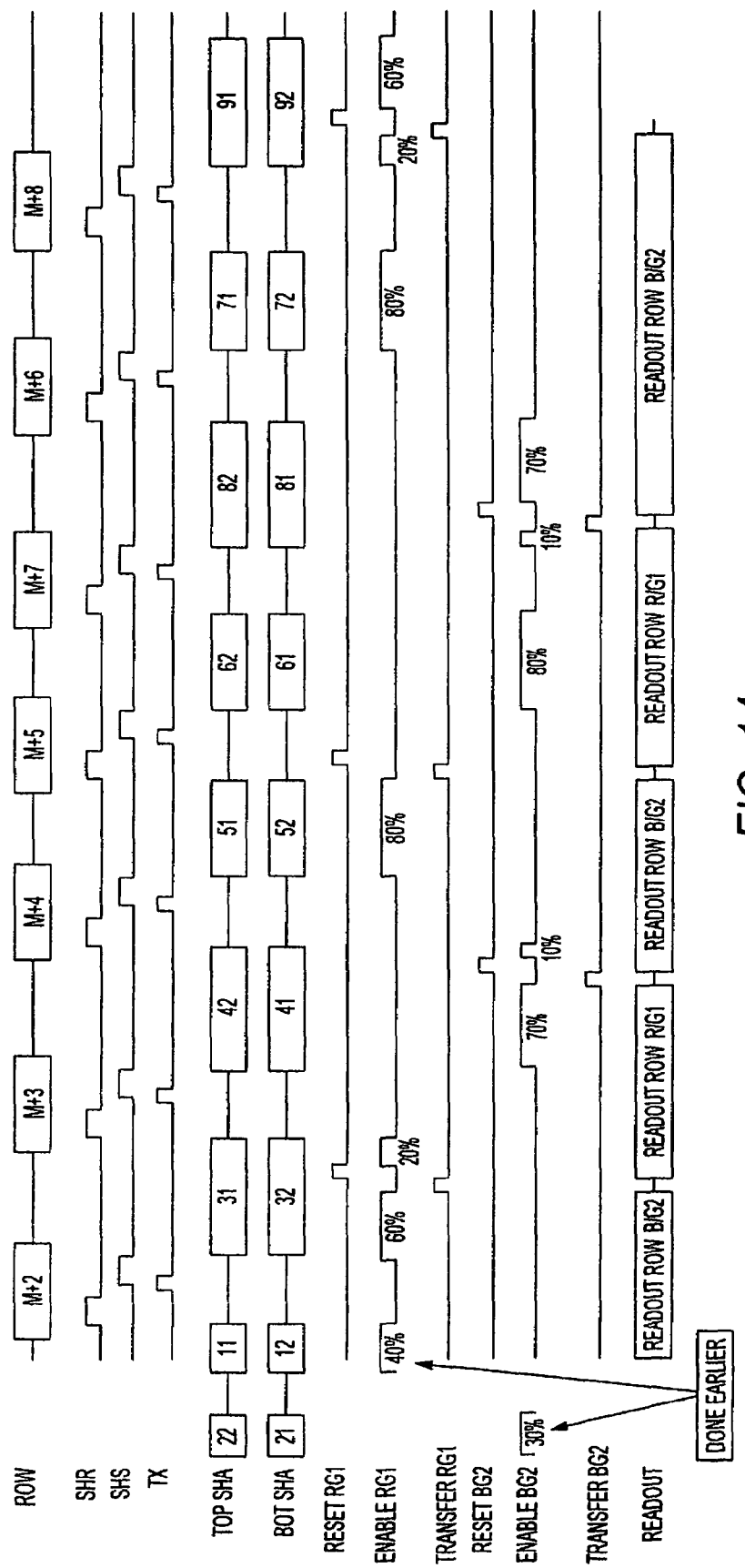
FIG. 14 is a timing diagram depicting an operation of the imaging system of FIG. 13.

FIG. 13 depicts a block diagram and FIG. 14 a timing diagram of a second embodiment of an imager system 990 which may be used to implement an arbitrary vertical scaling. This embodiment may also be used for integer vertical binning. The imager system 990 employs readout circuits which are similar to readout circuit 560, etc. described above; however imager system 990 has two counters and two latches associated with an analog to digital converter. For example, sigma-delta converter 754b has two associated counters 994a, 994b and two latches 996a, 996b respectively associated with the counters.

Pixels for each color are associated with a respective counter and latch. For example, red R color pixels are associated with sigma-delta counter 754a, counter 993a and latch 995a for storing signals from red color pixels; blue B color pixels are associated with sigma-delta counters 754a, counter 993b and latch 995b for storing signals from blue color pixels; green G1 color pixels are associated sigma-delta counters 754b, counter 994a and latch 996a for storing signals from green G1 color pixels; while green G2 color pixels are associated with sigma-delta counter 754b, counter 994b and latch 996b for storing signals from green G2 color pixels. As was seen above with respect to the description of FIGS. 11 and 12 embodiments, non integer binning requires the counters to be enabled for portions of a conversion period, depending upon the scaling applied and the corresponding scaling coefficient.

As with the first embodiment, each analog differential signal Vrst−Vsig for each pixel is counted more than once during a conversion. As a result, the total numbers of clock cycles for a conversion operation for the readout circuit may be apportioned among the pixels being combined in accordance with the scaling coefficient for a particular scaling size. For example, as seen above with respect to FIG. 12, the red pixel 371 in row M, would contribute 40% to a combined pixel signal and 60% of the combined pixel would come from the red pixel 373 in row M+2. Further, as seen above with respect to FIG. 12, the red pixel 373 in row M+2, would contribute 20% to a combined red pixel signal and the remaining 80% of the combined pixel would come from the red pixel 375 in row M+4.

The imaging system of FIG. 13 also includes a system controller 1066, capable of generating the FIG. 14, signals: SHR, SHS, TX as well as the signals Transfer BG2, ENABLEBG2, RESET BG2, TRANSFER RG1, ENABLE RG1, RESET RG1, and READOUT.

As in the first embodiment, two adjacent columns of a pixel array 340 share a sample of hold circuit 361 and a sigma-delta converter 754, e.g. 744a, 754b. However, in the FIG. 13 embodiment, each color R, B, G1, G2 pixel has an associated counter for accumulating counter pulses during a conversion period and a latch for storing and reading out the accumulated count values.

Each of the counters and latches associated with a color pixel share common control signal lines. For example, all of the counters 994a associated with different columns of the array 340 commonly receive the signals ENABLE RG1 and RESET RG1 and the latches 996a commonly receive a transfer signal TRANSFER RG1. Thus, each set of counters and latches for the colors R and G1 can be controlled as a group separate from the counters and latches for the colors B and G2. This enables the counters for different colors to be enabled for different lengths of times, under control of controller 1066. In the second embodiment, there is more flexibility, and counters for the different colors can be set differently for each readout, in accordance with a selected scaling.

The operation of the FIG. 14 embodiment will be described in connection with the 1.25 scaling example illustrated in FIG. 12 in which red pixels in rows M and M+2 are first combined in a ratio of 40% and 60% of the conversion time (40% of the combined signal is taken from a pixel in row M and 60% of the combined signal is taken from a pixel in row M+2). The red pixels in column 330 in rows M+4 and M+6 are combined in a ratio of 20% and 80% of the conversion time for rows M+4 and M+6. This pattern for red pixels repeats through the remaining rows of column 330. Likewise, the green G1 pixels in adjacent column 331 which are sampled and digitized at the same time as the red pixels are combined 40% from row M and 60% from row M+2 and 20% from row M+4 and 80% from rowM+6. This pattern repeats through the remaining rows of column 331.

Referring back to FIG. 12, the blue and green G2 pixels are combined in different proportions the blue pixels are first combined 30% from row M+1 and 70% from row M+3. The blue pixel in row M+3 is also combined at 10% with 80% with the blue pixel from row M+5 and 10% of the blue pixel from row M+7. This pattern repeats through the remaining rows of column 331. The green G2 pixels in column 330 are first combined 30% in row M+1 and with 70% from row M+3 and are also combined 10% from row M+3, 80% from row M+5, and 10% from row M+7.

Reference is now made to FIGS. 13 and 14 for an explanation of the FIG. 13 operation during a readout of array rows M+2 through M+8 to implement the FIG. 12 scaling example. It should be noted that in the circuit and timing diagram of FIG. 13, 14, the array pixel 340 in columns 330, 331 have been renumbered as red: 11, 31, 51, 71, 91; blue: 22, 42, 62, 82; green G1: 12, 32, 52, 72, 92; and green: G2 21, 41, 61, 81.

At a time prior to the readout of row M+2, the pixels in rows M and M+1 are readout and digitized. During the readout of row M, 40% of the row M red pixel 11 column 330 digital value was accumulated in counter 933a and 40% of the row M green G1 pixel 12 in column 331 was accumulated in counter 994a. During the row M+1 readout, a 30% blue pixel 22 from column 331 count was accumulated in counter 993b and a 30% green G2 pixel from column 330 count was accumulated in counter 994b.

During readout of row M+2, the analog reset Vrst and image signal Vsig values for pixels 31 and green G1 pixel 32 are sampled and held in each of the top and bottom sample and hold circuits 361a, 361b. First, the reset signal Vrst for pixel 31 generated when reset transistor (FIG. 1) is activated, is sampled and held in sample and hold circuit 361a under control of the SHR control, then transfer signal TX transfers photogenerated charge from the photo sensor 12 to the floating diffusion region 140 and this signal is sampled and held in sample and hold circuit 361a. At the same time, the same operations are occurring in sample and hold circuit 361b for pixel 32 which is connected to an adjacent column pixel in the same row. Referring back to FIG. 12, row M+2 has adjacent red R and green pixels, so, for example, sample and hold circuit 361 has the differential signal Vrst−Vsig for the red pixel 31 while sample and hold circuit 361b has the differential signal Vrst−Vsig for the green G1 pixel 32.

The analog to digital conversion process is then started in respective sigma-delta converters 754a 754b as represented by the signals TOP SHA, BOT SHA in FIG. 14. For the combined red pixel, counter 994a is holding a red value representing from 40% of the combined red pixel value which is taken from red pixel 11 in row M, and thus 60% of the conversion time is enabled for counter 993a by the counter enable signal ENABLE RG1 to further accumulate a digital value for red pixel 31. Also, the same conversion is concurrently occurring for 60% of the green value G1 in counter 994a, which is already storing a 40% conversion time green value of G1 for pixel 32 from the row M conversion of green G2 pixel 12. After the ENABLE RG1 signal is disabled, counter 913a is storing a combined red pixel value representing 40% of the value of the red pixel in row M and 60% of the value of the red pixel 31 in row M+2. Likewise, counter 993b is storing a combined green G1 pixel value representing 40% of the value of the green G1 pixel 12 in row M and 60% of the value of the green G1 pixel 32 in row M+2.

Since the conversion period is now over and combined red and green G1 pixel values are now held in counters 993a and 993b, the system controller 1066 issues a TRANSFER RG1 command which causes the red and green G1 counter values to be respectively latched in latches 995a and 996a for output on respective readout lines R and G1 during the time period labeled READOUT ROW RG1. Immediately after the TRANSFER RG1 signal is disabled, the system controller 1066 issues the RESET RG1 command which resets counters 993a and 996a. Since 20% of the row M+2 red and green G1 pixels 31 and 32 are needed for the next combined red and green G1 pixel (FIG. 12), controller 1066 again enables counters 993a, 994b by issuing the signal ENABLE RG1 to begin another conversion of the previously sampled and stored red 31 and green 32 pixels. Once the enable signal ENABLE RG1 is disabled, counter 993a is storing an M+2 red pixel value for 20% of the conversion period, while counter 994 is storing the M+2 green G1 pixel value, also for 20% of the conversion period.

At this point, row M+3 is read out but first the sample and hold circuits 361a, b are switched to the alternate column. Referring back to FIG. 12, during the M+2 row readout, sample and hold circuit 361a was connected to, e.g., column 330, while sample and hold circuit 361b was connected to, e.g., column 331. For row M+3 readout sample and hold circuit 361a is connected to column 331, while sample and holds circuit 361b is connected to column 330. As a consequence, a blue pixel is now sampled and held in circuit 361a, digitized in sigma-delta converter 754a and the output counted in counter 993b. A green pixel G2 is also now sampled and held in circuit 361b, digitized in sigma-delta converter 754b and the output counted in counter 994b.

Referring back to FIGS. 13 and 14, when row M+3 is read out, the blue and green G2 pixels are first reset and the reset signal at the pixel output is sampled under control of SHR, then the image signal is transferred by transfer signal TX to the pixel output and the output signal sampled under control of SHS. Then, the digital conversion of the difference Vrst–Vsig occurs for each pixel as shown by the signals TOP SHA and BOT SHA.

Referring again to FIG. 14, during the readout of row M+1, 30% blue and green G2 values were stored in respective counters 993b and 996b, so when row M+3 is read and digitized, the blue and green 62 signals added to counters 993b and 996b correspond to 70% of the conversion period. In order for this to occur, the signal ENABLE BG2 is enabled for a time period corresponding to 70% of the conversion period. At this point, counter 993b has a blue value corresponding to 30% of the conversion period taken from blue pixel 22 in column 331 and row M+1 and a blue value corresponding to 70% of a conversion period taken from a blue pixel 42 in column 331 and row M+3. Counter 994b has a green G2 value corresponding to 30% of a conversion period for green G2 pixel 21 in column 330 and row M+1 and a green G2 value corresponding to 70% of a conversion period taken from a green G2 pixel 41 in column 334 and row M+3.

Since the conversion period is now over a transfer signal TRANSFER BG2 is enabled and the contents of counters 993b and 994b are loaded into respective latches 995b and 996b for readout onto respective readout lines B, G2 when the READOUT ROW B/G2 signal appears.

The counters 993b and 994b are also reset by the signal RESET BG2. Immediately thereafter, the counters 993b and 994b are again enabled for 10% of a conversion period to store values for the blue pixel 42 in column 331, row M+3 in counter 993b and green G2 pixel 41 in column 330, row M+3.

For row M+4, the sample and hold circuits, 361a, 361b are switched again to exchange column inputs, the reset and image signal values (Vrst–Vsig) for red pixel 51 in column 330 and the green G1 pixel in column 331 of row M+4 are now loaded with respective sample and hold circuit 361a, 361b, by the signals TOPSHA, BOTSHA, and are converted by sigma-delta converters 754a and 754b. Since counters 993a and 994a are already storing 20% of the red 31 and green pixels 32 from the previous row M+2 readout, the red and green G1 pixels 51, 52 from row M+4 are digitized and read into counters 993a and 994a respectively for 80% of the conversion period under control of the ENABALE RG1 signal. Since the conversion period is now complete, the contents of counters 993a and 994a are transferred into respective latches 995a and 996a by the signal TRANSFER RG1 and the latch contents are read out in response to READOUT ROW R/G1. The counters 993a, 994a are also now reset by the signal RESET RG1.

Row M+5 is next readout and again the sample and hold circuits are switched such that sample and hold circuits 361a is connected to column 331 and sample and hold circuit 361b is connected to column 330. Counters 993b and 994b already contain respective blue and green G2 count values from pixels 42, 41 corresponding to 10% of a conversion period which were stored during readout of row M+3.

The blue and green G2 values for row M+5 are counted by respective counters 993b and 994b for 80% of a conversion period under control of the ENABLE BG2 signal and these counters now contain respective values for blue and green G2 pixels for 90% of a conversion period.

Row M+7 is next read (row M+6 is skipped at this time). Since row M+7 has a blue pixel 82 in column 331 and a green G2 pixel 81 in column 330, the sample and hold circuits 361a and 361b are not switched.

The Vrst, Vsig values for the blue and green G2 pixels 81, 82 in row M+7 are respectively sampled and held by sample and hold circuits 361a and 361b and respectively converted by sigma-delta converters 754a, 754b for a period corresponding to 10% of a conversion period by enabling counters 993b, 994b with the signal ENABLED BG2. Counters 993b, 994b each now hold values from 3 pixels corresponding to 100% of a conversion period. Accordingly, the values of counters 993b, 994b are transferred by the TRANSFER BG2 signal into respective latches 995b, 996b and are readout during the readout period READOUT ROW B/G2.

The counters 993b, 994b are also reset by the signal RESET BG2 and the blue and green G2 pixels 82, 81 are again counted for 70% of a conversion period by the ENABLE BG2 signal for later combination with pixels in row M+9 (not shown in the FIG. 14 timing chart). Once the blue and green G2 pixel of row M+7 are converted for 70% of a conversion period the readout of row M+7 is completed.

Previously skipped row M+6 is now readout and the sample and hold circuits 361a, b are switched again so that sample and hold circuits 361a, 361b are respectively connected to columns 330 and 331 to receive red and green G1 Vrst, Vsig pixel signals respectively. The differentiated pixel signals Vrst–Vsig are converted by respective sigma-delta converters 754a, 754b for a period corresponding to 80% of a conversion period by the ENABLE RG1 signal. Accordingly, counters 993a, 994a have respective red and green G1 pixel values for row M+6 corresponding to 80% of a conversion period.

Finally, the red and green G1 pixels in row M+8 are read and converted. Since the red and green G1 pixels are in the same column for rows M+6 and M+8, there is no need to switch the sample and hold circuits 361a, 361b. The counters 993a, 994a which are storing red and green G1 values for row M+6 corresponding to 80% of a conversion period are again enabled by the signal ENABLE RG1 for a period corresponding to 20% of a conversion period. Since the conversion period is now completed, the pixel values stored in counters 993a, 994a are transferred to respective latches 995a, 996a by the signal TRANSFER RG1 and the counters are then reset by the signal RESET RG2.

The readout and digitizing process carried out by readout circuits 361a, 754a, 993a, 995a for red pixels, by readout circuit 361a, 754a, 993b and 995b for blue pixels, by readout circuit 361b, 754b, 994a, 996a for green G1 pixels and by readout circuit 361b, 754b, 994b, 996b for green G2 pixels in the columns 330, 331 of a pixel array 340 is carried out in the same manner by like circuits for other paired columns of an array, as shown in FIG. 13.

The scaling coefficients, i.e., percentage of the digitizing period during which a pixel signal is digitized and counted for a combined pixel, are selected depending on the vertical scaling desired. Accordingly, the scaling percentages discussed with respect to FIGS. 12 and 13 is an example of vertical scaling which can be implemented by the FIG. 13 embodiment. It should be noted that the FIG. 13 embodiment can be used for both non-integer and integer vertical scaling.

Figure 15:
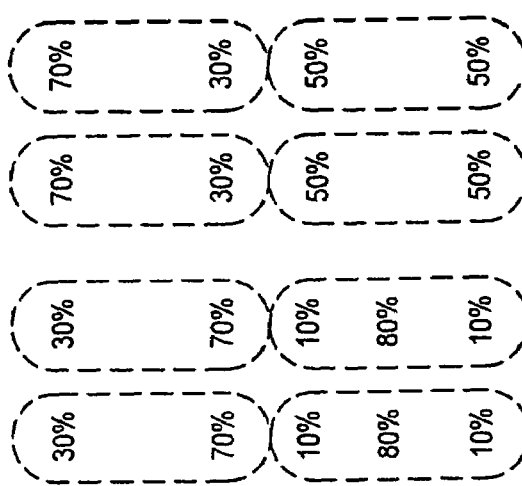
FIG. 15 is a block diagram of a portion of pixel array showing another way of forming combined pixels formed from two and three array pixels in accordance with the second embodiment.

FIG. 15 illustrates another example of non-integer vertical scaling which may be implemented with the FIG. 13 embodiment. In FIG. 15, a 1.25× scaling is applied to a pixel array 340 to form combined pixels. For the combined pixels from red pixels and green G1 pixels in columns of the pixel array there is a repeating pattern of 30%/70% alternating with a 10%/80%/10% conversion pattern. The combined pixels from blue and green G2 pixels in the pixel array are done on a repeating conversion pattern of 70%/30% alternating with 50%/50% conversion pattern.

Figure 16:
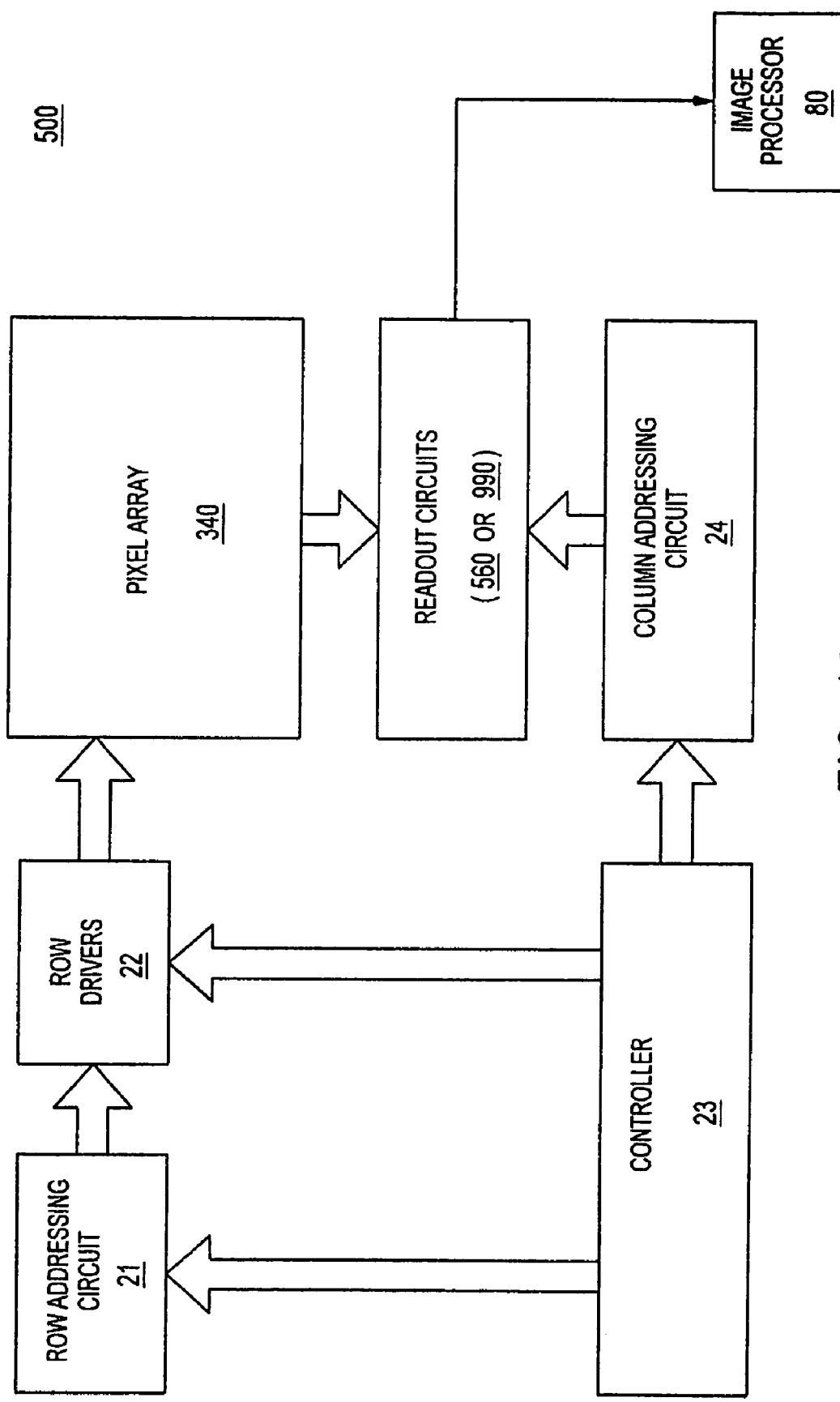
FIG. 16 is a block diagram of an imaging device constructed in accordance with embodiments of the invention.

Certain embodiments may be implemented using the pixel array readout circuits depicted in FIGS. 6 and 13, as part of an imager processing device 500 of the type illustrated in FIG. 16 with the readout and digitalization circuits employed in place of the FIG. 2 readout circuit 25 differential amplifier 26 and analog to digital converter (ADC).

The imager processing device 500 may be used in a larger imager processing system such as system 1100 shown in FIG. 17. The FIG. 17 processing system may include any image, acquisition, processing, or output system. Without being limiting, such a system could include a computer system, camera system, scanner, machine vision, vehicle navigation, video phone, surveillance system, auto focus system, star tracker system, motion detection system, image stabilization system, and other image acquisition, processing or output system.

System 1100, for example, a still or video digital camera system, generally comprises a central processing unit (CPU) 1110, such as a microprocessor, which controls camera operations includes image acquisition, storage, processing and output. The central processing unit 1110 communicates with one or more input/output (I/O) devices 1150 over a bus 1170. Imaging processing device 500 also communicates with the CPU 1110 over the bus 1170. The system 1100 also includes random access memory (RAM) 1160, and can include removable memory 1130, such as flash memory, which also communicate with the CPU 1110 over the bus 1170. The imaging processing device 500 may be combined with the CPU, digital signal processor, or microprocessor, with or without memory storage on a single integrated circuit or on a different integrated circuit from the CPU.

It should be appreciated that the invention also includes a method of fabricating image processing device 500 and the readout circuits associated therewith, and an image processing system 1100 containing the image processing device 500 on one or more integrated circuits.

While the invention has been described and illustrated with reference to specific embodiments, it should be understood that many modifications and substitutions could be made without departing from the spirit and scope of the invention. Accordingly, the invention is not to be considered as limited by the foregoing description but is only limited by the scope of the claims.

What is claimed as new and desired to be protected by Letters Patent of the United States is:

1. A readout circuit for an imager, said readout circuit comprising:
   a circuit for receiving, during a conversion period, analog output signals from a plurality of pixels in a plurality of rows of a common column of a pixel array and for digitally converting said signals received during said conversion period in a manner which provides an accumulated digital output signal representing the combination of the analog output signals from said plurality of pixels, wherein said circuit for receiving and converting comprises:
   a sample and hold circuit for receiving said analog output signals from said plurality of pixels;
   a counter for storing said accumulated digital output signal; and
   a digital converter for providing count values to said counter for each of said received analog output signals, wherein said digital converter has a total conversion period during which said counter accumulates count values, and each of said analog output signals from said plurality of pixels are converted for a respective portion of said total conversion period, said counter accumulating count values for each portion of said total conversion period.

2. A readout circuit as in claim 1 wherein said plurality of pixels are same color pixels.

3. A readout circuit as in claim 1 wherein said accumulated digital output signal represents an average value of equal proportions of said analog output signals from said plurality of pixels in said combination.

4. A readout circuit as in claim 3 wherein said plurality is an integer number of same color pixels.

5. A readout circuit as in claim 4 wherein said integer number is two.

6. A readout circuit as in claim 4 wherein said integer number is three.

7. A readout circuit as in claim 1 further comprising a control circuit for causing said column of said pixel array to be read out such that a plurality of same color pixels in different rows of said array are applied sequentially to said circuit for receiving.

8. A readout circuit as in claim 1 wherein said digital converter comprises a sigma-delta converter.

9. A readout circuit as in claim 1 wherein said plurality of pixels is an integer value N and each said respective portion of said total conversion period is equal to said total conversion period divided by N.

10. A readout circuit as in claim 1 further comprising a switch for selectively coupling said circuit for receiving and converting to a plurality of different columns of said pixel array.

11. A readout circuit as in claim 10 wherein said plurality of different columns is two different columns.

12. A readout circuit as in claim 11 wherein said two different columns are adjacent columns of said pixel array.

13. An imager readout circuit comprising:
   a counter for counting a digital count representation of a plurality of analog pixel signals from different pixels of the same color in a plurality of rows of a column of a pixel array during a conversion period; and a sigma-delta analog to digital converter for providing a digital count value from said different pixels to said counter, each during a respective portion of said conversion period of said converter, with all portions of said conversion period for said different pixels totaling the entire conversion period.

14. The imager readout circuit of claim 13, wherein said portion for each of said different pixels is approximately the same.

15. The imager readout circuit of claim 14, wherein said different pixels number two pixels.

16. The imager readout circuit of claim 14, wherein said different pixels numbers three pixels.

17. An imager comprising:
an array of pixel cells arranged in rows and columns, each pixel cell generating analog pixel output signals;
readout circuitry for reading out said array of pixel cells and forming digital values representing vertically combined output signals from a plurality of pixels of said array, said readout circuitry comprising a plurality of readout circuits, each for receiving, during a conversion period, analog output signals from a plurality of pixels in a plurality of rows of at least one column of said array, for converting said analog signals received during said conversion period to digital count values, and for forming a digital output value representing a combination of the digital count values of said plurality of pixels;
a plurality of switches respectively associated with said readout circuits for selectively connecting a plurality of columns of said array to each of said readout circuits;
a control circuit for operating said switches and readout circuits; and
an image processor for receiving and processing digital output values from said plurality of readout circuits,
wherein said plurality of switches and plurality of readout circuits are operable by said control circuit such that each readout circuit forms a first digital output value from a plurality of same color pixels in a first selected column of said array and a second digital output value from a plurality of same color pixels in a second selected column of said array.

18. An imager as in claim 17 wherein said analog pixel output signals include a first signal representing a reset state of a pixel and a second signal representing image light received by a pixel, each of said readout circuits forming a difference between said first and second signals and forming a digital count value representing said difference for each of said plurality of pixels, the digital count values for each of said plurality of pixels being represented in said digital output value.

19. An imager as in claim 18 wherein each said readout circuit comprises:
a sample and hold circuit for receiving said reset and image light signals from each of said plurality of pixels one at a time;
a digitizing circuit for forming a digital value representing the difference between said reset and image light signals for each of said plurality of pixels; and
an accumulator for accumulating said digital values for said plurality of pixels, said accumulator providing said digital output value.

20. An imager as in claim 18 wherein each readout circuit comprises:
a sample-and-hold circuit for receiving said reset and image light signals from each of said plurality of pixels;
at least one counter for storing said digital output value; and
a digital converter for providing count values to said at least one counter for each of said plurality of pixels for a portion of a conversion period.

21. An imager as in claim 19 wherein said digitizing circuit comprises a sigma-delta converter circuit.

22. An imager as in claim 21 wherein said accumulator is a counter.

23. An imager as in claim 17 wherein said plurality of switches and plurality of readout circuits are operable by said control circuit such that each column of an array is selectively connectable to two readout circuits and each readout circuit is selectively connectable to two columns of said pixel array, with each readout circuit connectable to only one array column during a pixel readout operation.

24. An imager as in claim 23 wherein a first set of said readout circuits and respective associated switches are located on a first side of said array and a second set of said readout circuits and respective associated switches are located on a second side of said array opposite said first side, said plurality of switches and plurality of readout circuits being operable by said control circuit such that one array column and an adjacent array column are each alternatively selectively connectable to a readout circuit in said first set and a readout circuit in a second set such that during a readout period said one column is connected to one of said readout circuits from said first set and second set and said adjacent column is connected to the other of said readout circuits from said first set and second set.

25. An imager as in claim 24 wherein said control circuit is operable such that at a first readout period said one readout circuit provides a digital output value representing the combination of first same color pixels in said one column while said other readout circuit provides a digital output value representing the combination of second same color pixels in said adjacent column.

26. An imager as in claim 25 wherein said control circuit is operable such that during a second readout period said one readout circuit provides a digital output value representing the combination of third same color pixels in said adjacent column while said other readout circuit provides a digital output value representing the combination of fourth same color pixels in said one column.

27. An imager as in claim 26 wherein said pixel array is arranged in a Bayer pattern and said first same color pixels are red pixels, said second same color pixels are first green pixels, said third same color pixels are blue pixels, and said fourth same color pixels are second green pixels.

28. A processing system comprising:
a processor; and
an imager coupled to said processor to provide acquired image signals, said imager comprising:
an array of pixel cells arranged in rows and columns, each pixel cell generating analog pixel output signals;
readout circuitry for reading out said array of pixel cells and forming digital values representing vertically combined output signals from a plurality of pixels of said array, said readout circuitry comprising a plurality of readout circuits, each for receiving, during a conversion period, analog output signals from a plurality of pixels in a plurality of rows of at least one column of said array, for converting said analog signals received during said conversion period to digital count values, and for forming a digital output value representing a combination of the digital count values of said plurality of pixels;

a plurality of switches respectively associated with said readout circuits for selectively connecting a plurality of columns of said array to each of said readout circuits; and a control circuit for operating said switches and readout circuits; and an image processor for receiving and processing digital output values from said plurality of readout circuits, wherein said plurality of switches and plurality of readout circuits are operable by said control circuit such that each readout circuit forms a first digital output value from a plurality of same color pixels in a first selected column of said array and a second digital output value from a plurality of same color pixels in a second selected column of said array.

29. A processing system as in claim 28, wherein said processing system is part of a digital camera.

30. A processing system as in claim 29, wherein said analog pixel output signals include a first signal representing a reset state of a pixel and a second signal representing image light received by a pixel, each of said readout circuits forming a difference between said first and second signals and forming a digital count value representing said difference for each of said plurality of pixels, the digital count values for each of said plurality of pixels being represented in said digital output value.

31. A processing system as in claim 30, wherein each readout circuit comprises:
a sample-and-hold circuit for receiving said reset and image light signals from each of said plurality of pixels;
at least one counter for storing said digital output value; and
a digital converter for providing count values to said at least one counter for each of said plurality of pixels for a portion of a conversion period.

32. A processing system as in claim 30, wherein each said readout circuit comprises:
a sample and hold circuit for receiving said reset and image light signals from each of said plurality of pixels one at a time;
a digitizing circuit for forming a digital value representing the difference between said reset and image light signals for each of said plurality of pixels; and
an accumulator for accumulating said digital values for said plurality of pixels, said accumulator providing said digital output value.

33. A processing system as in claim 32, wherein said accumulator is a counter.

34. A processing system as in claim 28, wherein said plurality of switches and plurality of readout circuits are operable by said control circuit such that each column of an array is selectively connectable to two readout circuits and each readout circuit is selectively connectable to two columns of said pixel array, with each readout circuit connectable to only one array column during a pixel readout operation.

35. A processing system as in claim 34, wherein a first set of said readout circuits and respective associated switches are located on a first side of said array and a second set of said readout circuits and respective associated switches are located on a second side of said array opposite said first side, said plurality of switches and plurality of readout circuits being operable by said control circuit such that one array column and an adjacent array column are each alternatively selectively connectable to a readout circuit in said first set and a readout circuit in a second set such that during a readout period said one column is connected to one of said readout circuits from said first set and second set and said adjacent column is connected to the other of said readout circuits from said first set and second set.

36. A processing system as in claim 35, wherein said control circuit is operable such that at a first readout period said one readout circuit provides a digital output value representing the combination of first same color pixels in said one column while said other readout circuit provides a digital output value representing the combination of second same color pixels in said adjacent column.

37. A processing system as in claim 36, wherein said control circuit is operable such that during a second readout period said one readout circuit provides a digital output value representing the combination of third same color pixels in said adjacent column while said other readout circuit provides a digital output value representing the combination of fourth same color pixels in said one column.

38. A processing system as in claim 37, wherein said pixel array is arranged in a Bayer pattern and said first same color pixels are red pixels, said second same, color pixels are first green pixels, said third same color pixels are blue pixels, and said fourth same color pixels are second green pixels.

39. A method of combining a plurality of pixels of a pixel array, said method comprising:
during a conversion period, sampling and holding analog output signals for a plurality of same color pixels in different rows of a same column of an array which are to be combined;
digitally converting the sample and hold values for each pixel of said plurality to a respective plurality of pulse output signals, wherein each said respective plurality of pulse output signals represents a respective portion of said conversion period;
counting said respective pluralities of pulse output signals for said plurality of pixels;
accumulating a digital value representing the analog output signals of said plurality of same color pixels in different rows of said same column of said array to provide a combined pixel digital value; and
providing said combined pixel accumulated digital values to an image processor.

40. A method as in claim 39 wherein each said digital conversion is a sigma-delta digital conversion.

41. A method as in claim 40 wherein said analog output signal for each said plurality of pixels comprises a reset signal and an image signal, said converting act converting a difference between said reset and image signals for each pixel.

42. A method as in claim 39 wherein respective portions of said conversion period are approximately equal.

43. A method as in claim 42 wherein said plurality of pixels is two pixels.

44. A method as in claim 42 wherein said plurality of pixels is three pixels.

45. A method as in claim 39, wherein the respective portions of said sigma-delta conversion period are related to the number of pixels used to produce said combined pixel digital value.

46. A method of combining a plurality of pixels of a pixel array, said method comprising:
during a first conversion period, sampling and holding analog signals for a plurality of same color pixels in different rows of a same column of an array which are to be combined;
sigma-delta converting the analog signals for each of said sampled and held pixels during a respective portion of said first conversion period to produce respective first digital pulse values for said pixels; and counting said respective digital pulse values to produce a first digital value for a first group pixel which represents the combination of the analog signals for said plurality of pixels.

47. The method as in claim 46 wherein said plurality of pixels are in two or more different rows of said array.

48. The method as in claim 46 further comprising:
sigma-delta converting the analog signals for at least one of said plurality of pixels during a second conversion period to produce second digital pulse values for at least one said pixel; and
counting said second digital pulse values to produce a portion of a second digital value for a second group pixel different from said first group pixel.

49. A method as in claim 46 wherein said respective portions of said conversion period for said plurality of pixels are approximately equal.

50. A method of reading out a plurality of pixels in a pixel array, said method comprising:
sampling and holding a reset signal and an image signal of a first plurality of same color pixels in a first column of a pixel array;
sigma-delta converting the difference between said reset and image signals for each said pixel of said first plurality to produce a first series of digital pulses;
counting said first series of pulses to produce a digital value representing the combination of signal values of said first plurality of pixels;
sampling and holding a reset signal and an image signal for a said second plurality of same color pixels in a second column of said pixel array;
sigma-delta converting the difference between said reset and image signals for each said pixel of said second plurality to produce a second series of digital pulses;
counting said second series of pulses to produce a digital value representing the combination of signal values of said second plurality of pixels;
sampling and holding a reset and an image signal for a third plurality of same color pixels in said first column of said pixel array;
sigma-delta converting the difference between said reset and image signals for each said pixel of said third plurality to produce a third series of digital pulses;
counting said third series of pulses to produce a digital value representing the combination of signal values of said third plurality of pixels;
sampling and holding a reset and an image signal for a fourth plurality of same color pixels in said second column of said pixel array;
sigma-delta converting the difference between said reset and image signals for each said pixel of said fourth plurality to produce a fourth series of digital pulses; and
counting said fourth series of pulses to produce a digital value representing the combination of signal values of said fourth plurality of pixels.

* * * * *